(12) United States Patent
Joo et al.

(10) Patent No.: US 12,506,354 B2
(45) Date of Patent: Dec. 23, 2025

(54) DISPLAY APPARATUS AND METHOD OF OPERATING SAME

(71) Applicant: Samsung Electronics Co., Ltd., Suwon-si (KR)

(72) Inventors: Sungyong Joo, Suwon-si (KR); Sungbum Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/623,445

(22) Filed: Apr. 1, 2024

(65) Prior Publication Data

US 2024/0372398 A1 Nov. 7, 2024

Related U.S. Application Data

(63) Continuation of application No. PCT/KR2024/003516, filed on Mar. 20, 2024.

(30) Foreign Application Priority Data

May 3, 2023 (KR) ........................ 10-2023-0057776

(51) Int. Cl.
*H02J 9/00* (2006.01)
*G09G 3/20* (2006.01)

(52) U.S. Cl.
CPC ............ *H02J 9/005* (2013.01); *G09G 3/2092* (2013.01); *G09G 2330/022* (2013.01); *G09G 2330/024* (2013.01)

(58) Field of Classification Search
CPC ...... Y02D 10/00; Y02D 30/50; G06F 1/3203; G06F 1/3287; G06F 1/3209;

(Continued)

(56) References Cited

U.S. PATENT DOCUMENTS

| 8,411,076 | B2 | 4/2013 | Berkay et al. |
| 9,136,753 | B2 | 9/2015 | Luthi |
| 11,277,024 | B2 | 3/2022 | Wang |
| 11,501,693 | B2 | 11/2022 | Kim et al. |

(Continued)

FOREIGN PATENT DOCUMENTS

| KR | 20070058200 A | 6/2007 |
| KR | 10-2009-0074367 | 7/2009 |

(Continued)

OTHER PUBLICATIONS

Search Report and Written Opinion dated Jul. 1, 2024 issued in International Patent Application No. PCT/KR2024/003516.

*Primary Examiner* — Sujit Shah
(74) *Attorney, Agent, or Firm* — Nixon & Vanderhye, P.C.

(57) ABSTRACT

Provided is a display apparatus and a method of operating the same. The display apparatus includes: a power supply configured to generate power to be supplied to the display apparatus from an external power source, an input interface configured to receive a turn-on command or a turn-off command for the display apparatus, a main module configured to operate at an operation voltage and control the input interface to receive the turn-off command, and a controller configured to operate at a standby voltage, wherein the controller is configured to: a first switch control signal to open a first switch to deliver the operation voltage to the main module based on the turn-off command, and output a second switch control signal to open a second switch connected between the external power source and the power supply based on the outputting of the first switch control signal.

18 Claims, 12 Drawing Sheets

(58) Field of Classification Search
CPC ..... G06F 1/3296; G06F 1/26; H04N 1/00896; H04N 2201/0094; H04N 21/4436; H04N 5/63; G09G 2330/021; G09G 5/006; G03G 15/5004; G03G 15/5016
See application file for complete search history.

(56) References Cited

U.S. PATENT DOCUMENTS

| | | | |
|---|---|---|---|
| 2009/0158057 A1* | 6/2009 | Begun | G06F 1/26 713/300 |
| 2010/0306558 A1* | 12/2010 | Kang | G06F 1/3203 713/300 |
| 2019/0115837 A1* | 4/2019 | Fahlenkamp | H02M 3/33507 |
| 2020/0133375 A1* | 4/2020 | Kobayashi | G06F 1/3284 |
| 2022/0385172 A1 | 12/2022 | Kim et al. | |

FOREIGN PATENT DOCUMENTS

| | | |
|---|---|---|
| KR | 10-2009-0074922 | 7/2009 |
| KR | 100956119 B1 | 5/2010 |
| KR | 20100120274 A | 11/2010 |
| KR | 10-2010-0139089 | 12/2010 |
| KR | 10-2012-0004315 | 1/2012 |
| KR | 10-2013-0115800 | 10/2013 |
| KR | 10-1657228 | 9/2016 |
| KR | 101789936 B1 | 10/2017 |
| KR | 20170142702 A | 12/2017 |
| KR | 20180084837 A | 7/2018 |
| KR | 101907094 B1 | 10/2018 |
| KR | 10-2021-0009564 | 1/2021 |
| KR | 10-2021-0026458 | 3/2021 |
| KR | 10-2021-0106212 | 8/2021 |

* cited by examiner

DISPLAY APPARATUS AND METHOD OF OPERATING SAME

CROSS-REFERENCE TO RELATED APPLICATIONS

This application is a continuation of International Application No. PCT/KR2024/003516 designating the United States, filed on Mar. 20, 2024, in the Korean Intellectual Property Receiving Office and claiming priority to Korean Patent Application No. 10-2023-0057776, filed on May 3, 2023, in the Korean Intellectual Property Office, the disclosures of each of which are incorporated by reference herein in their entireties.

BACKGROUND

Field

The disclosure relates to a display apparatus and method of operating the same, and for example, to a display apparatus including a power supply and a method of operating the display apparatus.

Description of Related Art

Display apparatuses such as televisions are generally equipped with a power supply such as a switched mode power supply (SMPS) for supplying power to operate respective components of a display apparatus. The power supply receives commercial power, alternate current (AC) power, converts the AC power into an operation voltage at a level required for a target to which power is to be supplied, and applies the voltage to the target.

The display apparatus may operate in a standby mode to minimize power consumption while not in use, and the power consumed in the standby mode is referred to as standby power. For example, even while the display apparatus is not used, the minimum circuits are operated to receive, e.g., a turn-on command, from the user and consumes power for the circuit operation.

Research on a method of minimizing the standby power has recently been actively conducted.

SUMMARY

According to an example embodiment of the disclosure, a display apparatus includes: a power supply configured to supply power to the display apparatus from an external power source, an input interface comprising circuitry configured to receive a turn-on command or a turn-off command for the display apparatus, a main module comprising circuitry configured to operate at an operation voltage, and a controller, comprising circuitry, configured to operate at a standby voltage.

The controller may be configured to output a first switch control signal to open a first switch for delivering the operation voltage to the main module based on the turn-off command.

The controller may be configured to output a second switch control signal to open a second switch connected between the external power source and the power supply, based on the outputting of the first switch control signal.

According to an example embodiment of the disclosure, a method of operating a display apparatus includes: controlling, by a main module operating at an operation voltage, an input interface to receive a turn-off command for the display apparatus, based on the turn-off command, outputting, by a controller operating at a standby voltage, a first switch control signal to open a first switch for delivering the operation voltage to the main module, and based on the outputting of the first switch control signal, outputting, by the controller, a second switch control signal to open a second switch connected between an external power source and a power supply for generating power to be supplied to the display apparatus from the external power source.

BRIEF DESCRIPTION OF THE DRAWINGS

The above and other aspects, features and advantages of a certain embodiment of the present disclosure will be more apparent from the following detailed description, taken in conjunction with the accompanying drawings, in which.

DETAILED DESCRIPTION

Figure 1:
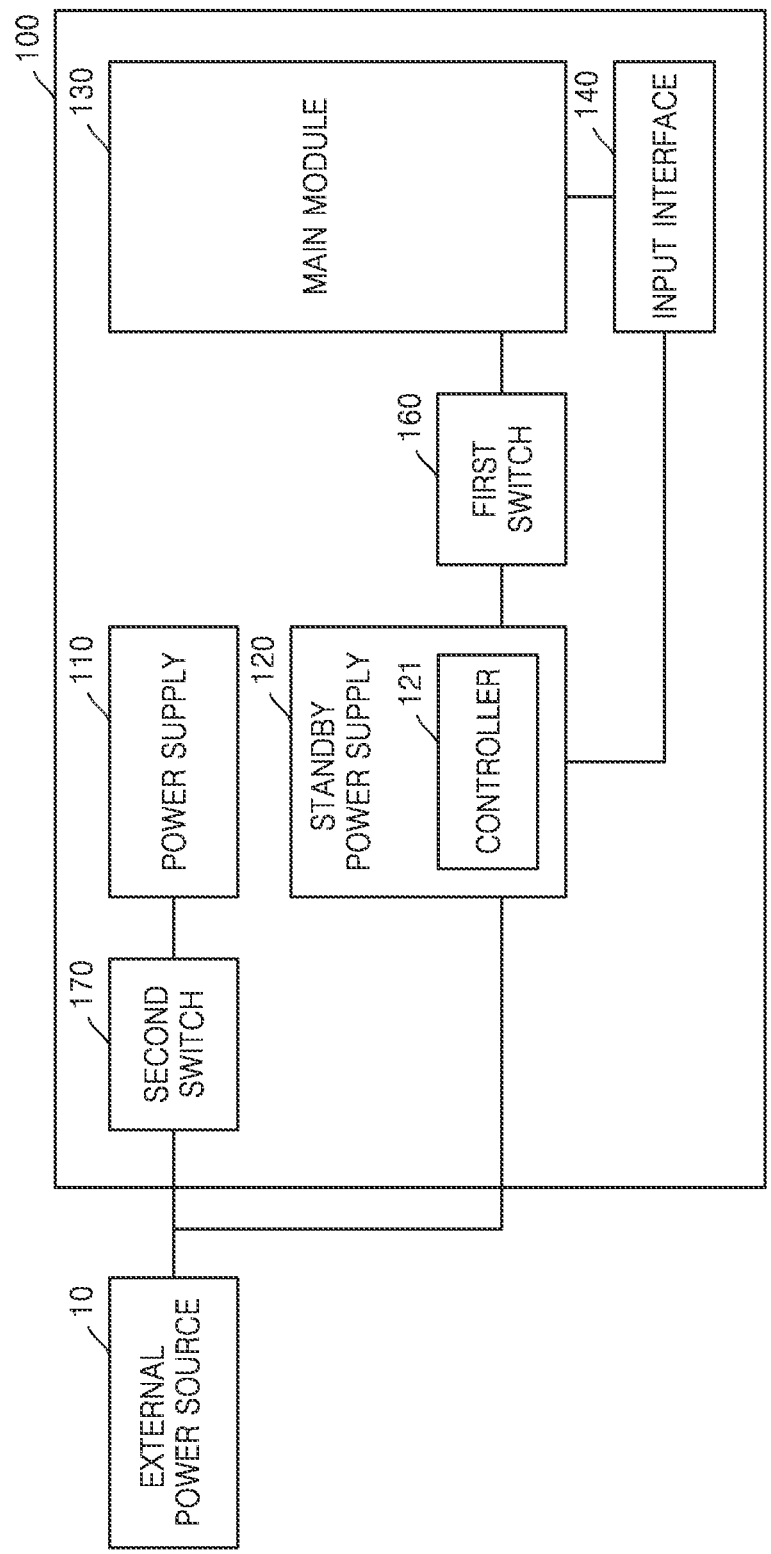
FIG. 1 is a block diagram illustrating an example configuration of a display apparatus, according to an embodiment of the disclosure.

Terms as used herein will be described before describing various example embodiments of the disclosure in greater detail.

All terms including descriptive or technical terms which are used in the disclosure should be construed as having meanings that are apparent to one of ordinary skill in the art. However, the terms may have different meanings according to the intention of one of ordinary skill in the art, precedent cases, or the appearance of new technologies. Some terms as herein used are selected arbitrarily, in which case, the meaning will be explained in detail in the description of the disclosure. Therefore, the terms used in the disclosure should not be interpreted based on only their names but have to be defined based on the meaning of the terms together with the descriptions throughout the disclosure.

When a part "includes" or "comprises" an element, unless there is a particular description contrary thereto, the part may further include other elements, not excluding the other elements. The terms "unit", "module", "block", etc., as used herein, each represent a unit for handling at least one function or operation, and may be implemented in hardware, software, or a combination thereof.

An embodiment of the disclosure will now be described in greater detail with reference to accompanying drawings. However, an embodiment of the disclosure may be implemented in many different forms, and are not limited to those discussed herein. In the drawings, parts unrelated to the description may be omitted for a clear description of the disclosure, and like numerals refer to like elements throughout the disclosure.

In an embodiment of the disclosure, the term 'user' may refer to a person who controls a system, a function or an operation, including a developer, an administrator, or an installation engineer.

In an embodiment of the disclosure, the term 'standby mode' may refer to a state in which a display apparatus has the display screen turned off and is able to receive a turn-on command of the user while in a power-off state.

In an embodiment of the disclosure, the term 'normal mode' has an opposite meaning of the standby mode, and may refer to a state in which the display screen is turned on and a processor such as a central processing unit (CPU) operates when the display apparatus is in a power-on state.

FIG. 1 is a block diagram illustrating an example configuration of a display apparatus, according to an embodiment of the disclosure.

Referring to FIG. 1, in an embodiment of the disclosure, a display apparatus 100 may include a power supply 110, a standby power supply 120 having a controller (e.g., including circuitry) 121, a main module (e.g., including circuitry) 130, and an input interface (e.g., including interface circuitry) 140.

The display apparatus 100 may include, for example, a television (TV) such as a smart TV, an Internet TV, a web TV, an Internet protocol (IP) TV or the like, a computer such as a desktop, a laptop, a tablet or the like, or various types of electronic devices capable of receiving and outputting content such as various smart devices, e.g., a smart phone, a cellular phone, a game player, a music player, a video player, medical equipment, a home appliance product, etc.

In an embodiment of the disclosure, the display apparatus 100 may operate in a normal mode while in a turn-on state. For example, in the normal mode, the power supply 100, the main module 130 and the input interface 140 of the display apparatus 100 may operate. For example, in the normal mode, the display apparatus 100 may supply operation power through the power supply 110 to operate the main module 130 and the input interface 140. Alternatively, for example, in the normal mode, the standby power supply 120 of the display apparatus 100 may operate, and the display apparatus 100 may supply operation power to operate the main module 130 and the input interface 140 through the standby power supply 120.

In an embodiment of the disclosure, the display apparatus 100 may operate in a standby mode to minimize and/or reduce power consumption while in a turn-off state and not in use. In the standby node, the display apparatus 100 may operate the minimum circuits for operating the input interface 140 to receive a turn-on command from the user. For example, in the standby mode, the power supply 110 and the main module 130 of the display apparatus 100 may not operate. For example, in the standby mode, the standby power supply 120, the controller 121 and the input interface 140 of the display apparatus 100 may operate. For example, in the standby mode, the display apparatus 100 may generate a standby voltage to operate the controller 121 through the standby power supply 120, and, through the controller 121, control operation power to be blocked from being supplied to the power supply 110 and the main module 130 and operate the input interface 140.

In an embodiment of the disclosure, when receiving a turn-off command from the input interface 140, the display apparatus 100 may perform a series of operations to operate in the standby mode. For example, the display apparatus 100 may perform an operation of being switched from the normal mode to the standby mode.

In an embodiment of the disclosure, when receiving a turn-on command from the input interface 140, the display apparatus 100 may perform a series of operations to operate in the normal mode. For example, the display apparatus 100 may perform an operation of being switched from the standby mode to the normal mode.

Respective components of the display apparatus 100 will now be described in greater detail.

The display apparatus 100 may supply operation power to the components of the display apparatus 100 through the power supply 110. The display apparatus 100 may supply the operation power to the input interface 140 in the standby mode through the standby power supply 120.

The power supply 110 may generate power to be supplied to the display apparatus 100 from the external power source 10. The power supply 110 may receive alternate current (AC) power from the external power source 10, convert the AC power into power having a level required to operate the respective components such as the main module 130, the input interface 140 and a display 150 (see FIG. 2) and supply the converted power to the components. For example, the power supply 110 may include a converter implemented as an insulated switched mode power supply (SMPS).

The power supply 110 may operate in the normal mode of the display apparatus 100. The power supply 110 may not operate in the standby mode of the display apparatus 100 and the whole functions may be stopped from being performed.

The standby power supply 120 may generate direct current (DC) power from the external power source 10. For example, the standby power supply 120 may generate an operation voltage to operate the main module 130. For example, the standby power supply 120 may convert the operation voltage to a standby voltage to operate the controller 121 of the display apparatus 100. The standby power supply 120 may operate the main module 130 at the operation voltage and operate the controller 121 at the standby voltage.

The standby power supply 120 may operate in the standby mode of the display apparatus 100. The standby power supply 120 may or may not operate in the normal mode of the display apparatus 100.

The controller 121 may include various circuitry and operate at the standby voltage generated by the standby power supply 120 and control the input interface 140 to operate. For example, the controller 121 may control the input interface 140 to operate to receive the turn-on command in the standby mode of the display apparatus 100.

When the display apparatus 100 receives the turn-off command, the display apparatus 100 may execute, through the controller 121, a stored program to operate the display apparatus 100 in the standby mode. For example, the controller 121 may control not to operate the components not in use to minimize and/or reduce standby power and block a leakage current, based on the turn-off command. For example, the controller 121 may control supplying of power to the power supply 110 and the main module 130 to be blocked, based on the turn-off command. The controller 121 may minimize and/or reduce the standby power to be consumed by the power supply 110 and the main module 130 in the standby mode and minimize and/or reduce the leakage current by blocking power supply to the power supply 110 and the main module 130.

When the display apparatus 100 receives the turn-on command, the display apparatus 100 may execute, through the controller 121, a stored program to operate the display apparatus 100 back in the normal mode from the standby mode. For example, the controller 121 may control power to be supplied to the power supply 110 and the main module 130, based on the turn-on command.

The controller 121 may operate in the standby mode of the display apparatus 100. The controller 121 may or may not operate in the normal mode of the display apparatus 100.

The main module 130 may include various circuitry and control general operation of the display apparatus 100. The main module 130 may receive and process an image signal, and based on this, display an image. The main module 130 may be configured in software, hardware, or a combination of hardware and software. When the main module 130 includes a hardware configuration, the main module 130 may include a printed circuit board (PCB). The main module 130 may include at least one processor and a memory. For example, the at least one processor may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The at least one processor may, for example, execute various software programs or instructions stored in the memory to perform various functions. The memory may store various software programs (or applications) for operating the display apparatus 100, data and instructions for operating the display apparatus 100.

The main module 130 may operate at operation power. For example, the main module 130 may receive the operation power from the standby power supply 120. Alternatively, for example, the main module 130 may receive the operation power from the power supply 110. The main module 130 may control the input interface 140 in the normal mode. For example, the main module 130 may control the input interface 140 to receive the turn-off command, a channel control command, a volume control command, etc., in the normal mode. In the meantime, the turn-off command for the display apparatus 100 may be received from the main module 130 or the controller 121 in the normal mode.

In the standby mode, the main module 130 may not operate and all the functions may be stopped from being performed. For example, in the standby mode, the controller 121 may turn off a first switch 160 for delivering the operation power to the main module 130. Alternatively, for example, in the standby mode, the controller 121 may stop the power supply 110 from delivering the operation power to the main module 130. Furthermore, in the standby mode, the controller 121 controls the input interface 140 to operate, so there is no need to supply the operation power to the main module 130. Accordingly, the main module 130 does not operate in the standby mode, thereby minimizing/reducing standby power from switching operations of the main module 130.

The input interface 140 may include various interface circuitry and receive a command to be used for the display apparatus 100 from outside (e.g., from the user). The input interface 140 may include, for example, a microphone for receiving voice of the user, a camera for obtaining an image corresponding to a motion of the user, and an infrared (IR) receiver for receiving an IR signal corresponding to a user input. For example, the input interface 140 may receive a control command including the turn-on command or the turn-off command for the display apparatus 100 from a remote control device (e.g., a remote control) through a short-range wireless communication interface such as Bluetooth, near-field communication (NFC) or an IR receiver. For example, the input interface 140 may forward the control command to the processor of the main module 130. Furthermore, for example, the input interface 140 may forward the control command directly to the controller 121.

The input interface 140 may operate in the standby mode of the display apparatus 100. For example, in the standby mode, the input interface 140 may forward the received control command not to the processor of the main module 130 but to the controller 121.

The input interface 140 may operate in the normal mode of the display apparatus 100. For example, in the normal mode, the input interface 140 may forward the received control command to the processor of the main module 130 and/or the controller 121.

In an embodiment of the disclosure, the display apparatus 100 may further include the first switch 160 and a second switch 170.

The first switch 160 may be located between an output end of a circuit that generates an operation voltage for the main module 130 in the standby power supply 120 and the main module 130. For example, the operation voltage for the main module 130 may be generated by a trans circuit 123 of FIG. 2. The first switch 160 may pass or block the operation voltage for operating the main module 130 to the main module 130, based on a first switch control signal received from the controller 121.

The second switch 170 may be located between the external power source 10 and the power supply 110. The second switch 170 may pass or block AC power for operating the power supply 110 to the power supply 110, based on a second switch control signal received from the controller 121. In an embodiment of the disclosure, the display apparatus 100 may minimize/reduce standby power by controlling the first switch 160 and the second switch 170 through the controller 121.

In an embodiment of the disclosure, the controller 121 may control the operation voltage for operating the main module 130 not to be delivered to the main module 130, based on the turn-off command. For example, the controller 121 may output the first switch control signal to open the first switch 160 located between the output end of the operation voltage and the main module 130. The first switch control signal may be a signal to turn off the first switch 160. Accordingly, power consumption from the operation of the main module 130 may be minimized and/or reduced.

In an embodiment of the disclosure, the controller 121 may control supplying of external power from the external power source 10 to the power supply 110 to be blocked, based on the turn-off command. For example, the controller 121 may output the second switch control signal to open the second switch 170 located between the power supply 110 and the external power source 10. The second switch control signal may be a signal to turn off the second switch 170. Accordingly, power consumption from the operation of the power supply 110 may be minimized and/or reduced.

In an embodiment of the disclosure, the controller 121 may output the second switch control signal to close the second switch 170 to connect the power supply 110 to the external power source 10, based on the turn-on command. The second switch control signal may be a signal to turn on the second switch 170.

In an embodiment of the disclosure, the controller 121 may output the first switch control signal to close the first switch 160 that delivers the operation power to the main module 130, based on the turn-on command. The first switch control signal may be a signal to turn on the first switch 160.

In an embodiment of the disclosure, in the standby mode, the display apparatus 100 may generate a standby voltage, operate the controller 121 at the standby voltage, and operate the input interface 140 for receiving the turn-off command. In the standby mode, the display apparatus 100 may operate the input interface 140 and the controller 121 and block supplying of power for operating the other circuits such as the power supply 110 or the main module 130. As the power supply 110 does not operate in the standby mode, power consumption from power transformation may be minimized and/or reduced. Furthermore, as the main module 130 does not operate in the standby mode, power consumption for controlling the input interface 140 may be minimized and/or reduced.

Figure 2:
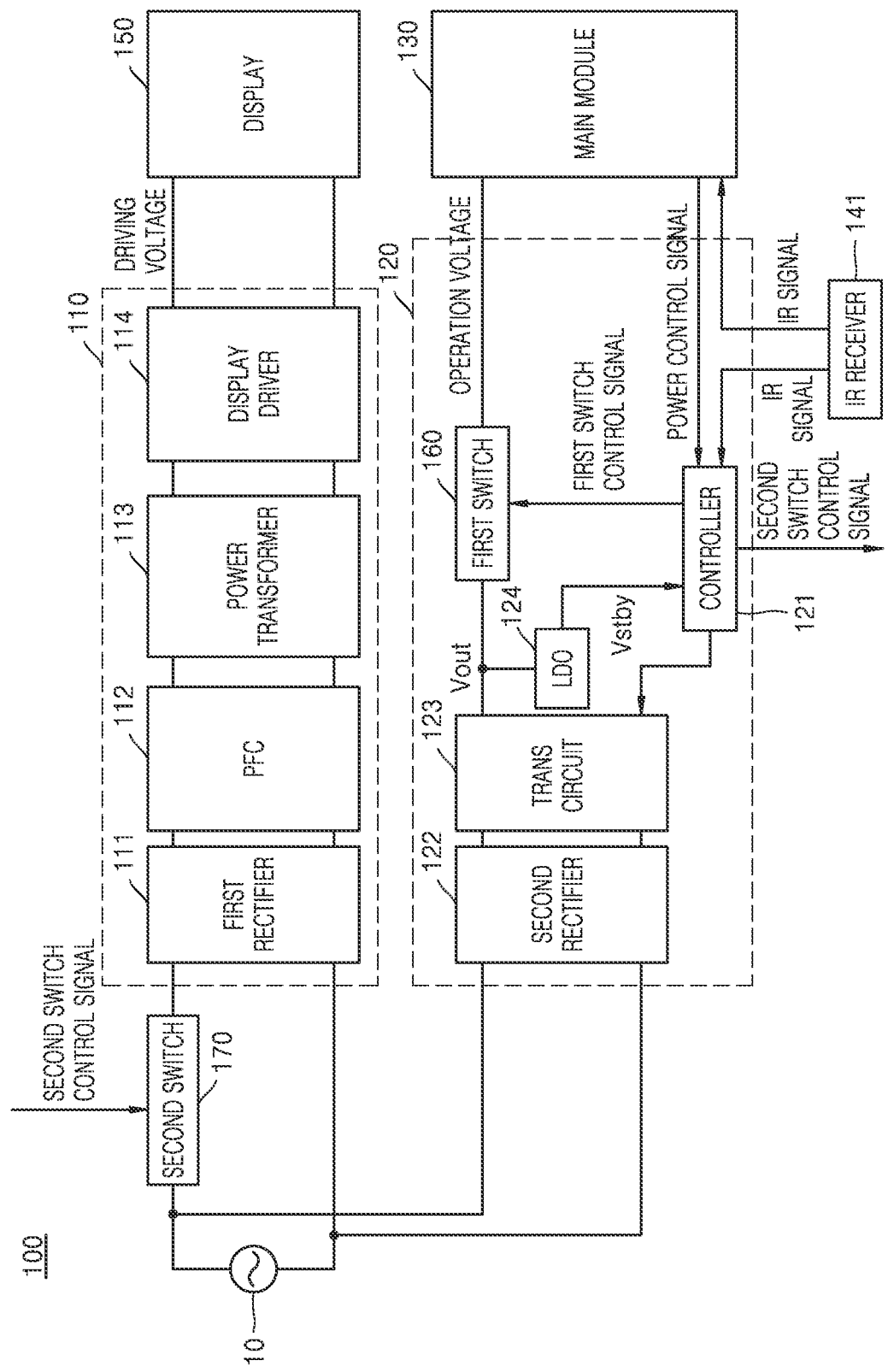
FIG. 2 is a block diagram illustrating an example configuration of a power supply and a standby power supply of a display apparatus, according to an embodiment of the disclosure.

FIG. 2 is a block diagram illustrating an example configuration of a power supply and a standby power supply of a display apparatus, according to an embodiment of the disclosure.

Referring to FIG. 2, the display apparatus 100 may include the power supply 110, the standby power supply 120, the main module 130, an IR receiver (e.g., including IR receiving circuitry) 141, the display 150, the first switch 160 and the second switch 170.

In an embodiment of the disclosure, the power supply 110 may include a first rectifier 111, a power factor (PF) corrector 112, a power transformer 113 and a display driver 114.

The power supply 110 may receive AC power from the external power source 10. The power supply 110 may convert the AC power received from the external power source 10 to DC power. The power supply 110 may supply required power to the display 150.

The first rectifier 111 may rectify the power received from the external power source 10. The first rectifier 111 may convert the received AC power to DC power. For example, the first rectifier 111 may supply a one-directional voltage or current. For example, the first rectifier 111 may be implemented as a half-wave or full-wave circuit for rectification, e.g., with bridge diodes.

The PF corrector (PFC) 112 may correct a PF of the DC power converted by the first rectifier 111 and output a DC voltage subjected to PF correction. The PFC 112 may minimize and/or reduce reactive power by correcting the phase and shape of the DC power input from the first rectifier 111. For example, the PFC 112 may control a converter to output a DC voltage with a better PF. For example, the DC voltage may be about 390 V, but is not limited thereto.

The power transformer 113 may regulate the DC voltage output from the PFC 112 and supply a voltage of a constant level to each component such as the display 150. The power transformer 113 may include an insulated converter and a transformer having a primary side (input side) and a secondary side (output side) insulated from each other. For example, when there is a change in current in primary winding on the primary side of the power transformer 113, electromotive force may be induced to secondary winding on the secondary side due to a change in flux and the induced current may flow in the secondary winding. For example, the power transformer 113 may generate power (e.g., a driving voltage Vdrv) required to operate the display 150. The power transformer 113 may be implemented as e.g., a DC-DC local link converter (LLC), without being limited thereto.

The display driver 114 may supply the driving voltage Vdrv required for the display 150 to display an image (or a video image).

The display 150 may display the image (or the video image). For example, the display 150 may display the image based on received image information. The image information may be, for example, stored in an internal memory of the main module 130 or received from an external device. The display 150 may include a plurality of pixels including light emitting diodes (LEDs), organic LEDs (OLEDs), etc. The display 150 may be operated based on the driving voltage Vdrv.

In an embodiment of the disclosure, the standby power supply 120 may include a second rectifier 122, a trans circuit 123, a low dropout (LDO) regulator 124 and the controller 121. In the disclosure, each of the first switch 160 and the second switch 170 may be a component included in the standby power supply 120 or may be implemented as a separate component from the standby power supply 120.

The standby power supply 120 may receive AC power from the external power source 10. The standby power supply 120 may convert the AC power received from the external power source 10 to DC power. The standby power supply 120 may supply a required operation voltage to the main module 130. The standby power supply 120 may supply a standby voltage Vstby required for the controller 121.

The second rectifier 122 may rectify the power received from the external power source 10. The second rectifier 122 may convert the received AC power to DC power. For example, the second rectifier 122 may supply a one-directional voltage or current. For example, the second rectifier 122 may be implemented as a half-wave or full-wave circuit for rectification, e.g., with bridge diodes.

The trans circuit 123 may regulate the DC power output from the second rectifier 122 and supply a voltage of a constant level to each component such as the controller 121, the main module 130, etc. The trans circuit 123 may include an insulated converter and a transformer having a primary side (input side) and a secondary side (output side) insulated from each other. For example, when there is a change in current in primary winding on the primary side of the trans circuit 123, electromotive force may be induced to the secondary winding on the secondary side due to a change in flux and the induced current may flow in the secondary winding. For example, the trans circuit 123 may induce the voltage applied from the primary side to the secondary side and output the voltage. For example, the trans circuit 123 may rectify the voltage output from the trans circuit 123 using diodes and capacitors connected to the secondary side to output a voltage with the same magnitude as a preset voltage. For example, the trans circuit 123 may output an output voltage Vout having the same magnitude as the operation voltage for the main module 130. For example, the preset voltage may be about 13 V, but is not limited thereto. For example, the output voltage Vout may equal to, higher than or lower than 13 V. For example, the trans circuit 123 may generate the standby voltage Vstby to be provided to the controller 121 through the LDO regulator 124. The trans circuit 123 may be implemented as e.g., a flyback converter, without being limited thereto.

The LDO regulator 124 may be a linear regulator that operates at a low input and output potential difference. The LDO regulator 124 may generate an output voltage lower than an input voltage. For example, the LDO regulator 124 may output the standby voltage Vstby with an input of the output voltage Vout of the trans circuit 123. For example, the LDO regulator 124 may generate the standby voltage Vstby lower than the output voltage Vout. For example, the output voltage Vout may be about 13 V equal to the operation voltage of the main module 130, and the standby voltage Vstby may be about 3.3 V. For example, the LDO regulator 124 may apply the standby voltage Vstby to the controller 121, and the controller 121 may operate in the standby mode at the standby voltage Vstby.

The controller 121 may operate at the standby voltage Vstby received from the LDO regulator 124. The controller 121 may control the IR receiver 141 to operate, based on the standby voltage Vstby. The controller 121 may receive the turn-on command or the turn-off command for the display apparatus 100 through the IR receiver 141.

The IR receiver 141 may receive an IR signal corresponding to a user input. The IR receiver 141 may be merely an example of the input interface 140, but the input interface 140 is not limited thereto.

For example, the turn-on command or the turn-off command for the display apparatus 100 may be an IR signal in an IR communication scheme. On receiving the turn-on command or the turn-off command for the display apparatus 100 through the IR receiver 141, the controller 121 may control whether to supply power to be applied to the power supply 110 and the main module 130. For example, the controller 121 may control whether to supply power to be applied to the main module 130 by outputting the first switch control signal to turn on or turn off the first switch 160. For example, the controller 121 may control whether to supply power to be applied to the power supply 110 by outputting the second switch control signal to turn on or turn off the second switch 170.

For example, on receiving the turn-off command for the display apparatus 100 through the IR receiver 141, the controller 121 may control the power to be blocked from being applied to the power supply 110 and the main module 130. For example, the controller 121 may provide the second switch control signal to turn off the second switch 170 in order to block the power to the power supply 110. For example, the controller 121 may provide the first switch control signal to turn off the first switch 160 to block the power to the main module 130.

Furthermore, for example, on receiving the turn-on command for the display apparatus 100 through the IR receiver 141, the controller 121 may control the power to be supplied to the power supply 110 and the main module 130. For example, the controller 121 may provide the second switch control signal to turn on the second switch 170 in order to supply power to the power supply 110. For example, the controller 121 may provide the first switch control signal to turn on the first switch 160 to supply the operation power to the main module 130.

The main module 130 may operate based on an operation voltage (e.g., a first operation voltage) received from the power supply 110. Furthermore, the main module 130 may operate based on an operation voltage (e.g., a second operation voltage) received from the standby power supply 120. The main module 130 may output a power control signal (e.g., PS_ON) which is an on signal or an off signal, to the controller 121. For example, the main module 130 may provide the power control signal, which is an off signal, to the controller 121 so that the controller 121 operates in the standby mode. For example, the main module 130 may provide the power control signal, which is an on signal, to the controller 121 so that the controller 121 operates in the normal mode. The controller 121 may receive the power control signal, which is an on or off signal, from the main module 130.

In an embodiment of the disclosure, on receiving the turn-off command for the display apparatus 100 through the IR receiver 141 in the normal mode, the main module 130 may store a state being currently worked on in the memory as it is, and provide the power control signal which is an off signal, to the controller 121 so that the controller 121 operates in the standby mode. The controller 121 may perform an operation to switch the display apparatus 100 into the standby mode, based on the power control signal as an off signal received from the main module 130. For example, based on the power control signal, the controller 121 may control the first switch 160 by outputting the first switch control signal and control the second switch 170 by outputting the second switch control signal.

Alternatively, in an embodiment of the disclosure, based on receiving the turn-off command for the display apparatus 100 through the IR receiver 141 in the normal mode, the controller 121 may perform an operation to switch the display apparatus 100 into the standby mode.

In an embodiment of the disclosure, based on receiving the turn-on command for the display apparatus 100 through the IR receiver 141 in the standby mode, the controller 121 may perform an operation to switch into the normal mode. For example, based on the turn-on command, the controller 121 may supply power to the power supply 110 by outputting the second switch control signal and supply the operation voltage to the main module 130 by outputting the first switch control signal. The main module 130 may operate based on the operation voltage, and the main module 130 may output the power control signal, which is an on signal, to the controller 121 so that the controller 121 operates in the normal mode.

In an embodiment of the disclosure, in the standby mode of the display apparatus 100, the IR receiver 141 and the controller 121 are the key components that consume power. The controller 121 may identify whether the turn-on command for the display apparatus 100 is received from the IR receiver 141, thereby minimizing/reducing the standby power consumed to operate the power supply 110 and/or the main module 130. For example, the standby power of the display apparatus 100 may be lower than about 0.005 W.

Figure 3:
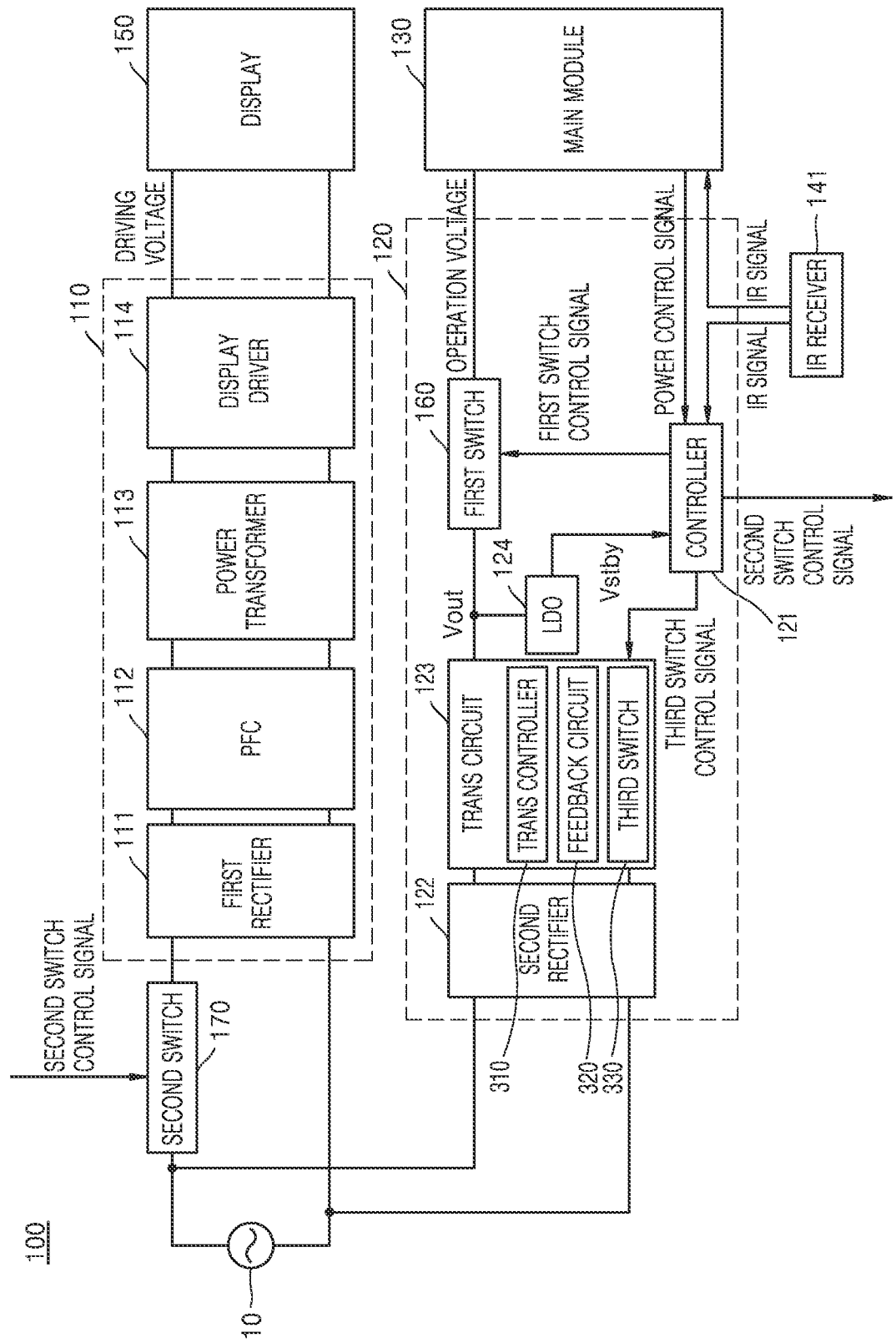
FIG. 3 is a block diagram illustrating an example configuration of a power supply and a standby power supply of a display apparatus, according to an embodiment of the disclosure.

FIG. 3 is a block diagram illustrating an example configuration of a power supply and a standby power supply of a display apparatus, according to an embodiment of the disclosure.

Referring to FIG. 3, the display apparatus 100 may include the power supply 110, the standby power supply 120, the main module 130, the IR receiver 141, the display 150, the first switch 160 and the second switch 170. Furthermore, in an embodiment of the disclosure, the display apparatus 100 may further include a trans controller (e.g., including circuitry) 310, a feedback circuit 320 and a third switch 330, which are included in the trans circuit 123.

In an embodiment of the disclosure, the trans circuit 123 may include the trans controller 310 and the feedback circuit 320.

The trans controller 310 may include various circuitry and control the trans circuit 123 to output the output voltage Vout having the same magnitude as a preset voltage. The trans controller 310 may apply a control signal to the trans circuit 123 to adjust an on/off duty ratio of the switch 510 (see FIG. 5). For example, the trans controller 310 may be implemented with a pulse width modulation (PWM) integrated circuit (IC), without being limited thereto.

When the output voltage Vout output from the trans circuit 123 is out of a range of the preset voltage, the feedback circuit 320 may output a feedback signal to the trans controller 310. The trans circuit 123 may generate, through the feedback circuit 320, the output voltage Vout having the same magnitude as the operation voltage for the main module 130. For example, the feedback circuit 320 may include an opto-coupler, for example.

The trans circuit 123 may further include the third switch 330 for delivering, to the feedback circuit 320, the operation voltage to operate the feedback circuit 320. The third switch 330 may be located between the feedback circuit 320 and the operation voltage. The third switch 330 may be closed or opened based on a third switch control signal, which is an on or off signal, received from the controller 121. For example, the third switch 330 may be closed based on the third switch control signal as an on signal received from the controller 121, to deliver the operation voltage to operate the feedback circuit 320. For example, the third switch 330 may be opened based on the third switch control signal as an off signal received from the controller 121, to block the operation voltage for operating the feedback circuit 320.

The controller 121 may receive the standby voltage, output the first switch control signal to the first switch 160, output the second switch control signal to the second switch 170, and output the third switch control signal to the third switch 330.

In an embodiment of the disclosure, the controller 121 may output a switch control signal to turn off the feedback circuit 320, e.g., the third switch control signal, which is the off signal, based on the turn-off command for the display apparatus 100. The feedback circuit 320 may be turned off according to the third switch control signal. As the feedback circuit 320 is turned off, the trans controller 310 may operate in a burst method. The burst method may refer to a light load operation, which is an operation to increase efficiency when an amount of use of the output current is not large. For example, the trans controller 310 may increase the efficiency by reducing on/off switching frequency of a switch 540 per unit time according to the burst method. For example, according to the burst method, the trans controller 310 may make a turn-on period or turn-off period of the switch 540 constant, and change the frequency.

In an embodiment of the disclosure, the controller 121 may output the first switch control signal and the second switch control signal sequentially and output the third switch control signal, based on the turn-off command for the display apparatus 100.

Furthermore, in an embodiment of the disclosure, the controller 121 may output a switch control signal to turn on the feedback circuit 320, e.g., the third switch control signal, which is the on signal, based on the turn-on command for the display apparatus 100. The feedback circuit 320 may be turned on according to the third switch control signal. When the feedback circuit 320 operates, the trans controller 310 may maintain a constant on/off switching frequency per unit time by keeping a constant frequency according to a PWM method and changing a turn-on period or turn-off period of the switch 540 (e.g., controlling a duty ratio). The PWM method may be different from the burst method.

In an embodiment of the disclosure, the controller 121 may output the third switch control signal and then sequentially output the second switch control signal and the first switch control signal, based on the turn-on command for the display apparatus 100.

In an embodiment of the disclosure, in the standby mode of the display apparatus 100, the IR receiver 141 and the controller 121 are the key components that consume power. The controller 121 may identify whether the turn-on command for the display apparatus 100 is received from the IR receiver 141, thereby minimizing and/or reducing the standby power consumed to operate the power supply 110, the main module 130 and/or the feedback circuit 320. For example, the standby power of the display apparatus 100 may be lower than about 0.005 W.

Figure 4:
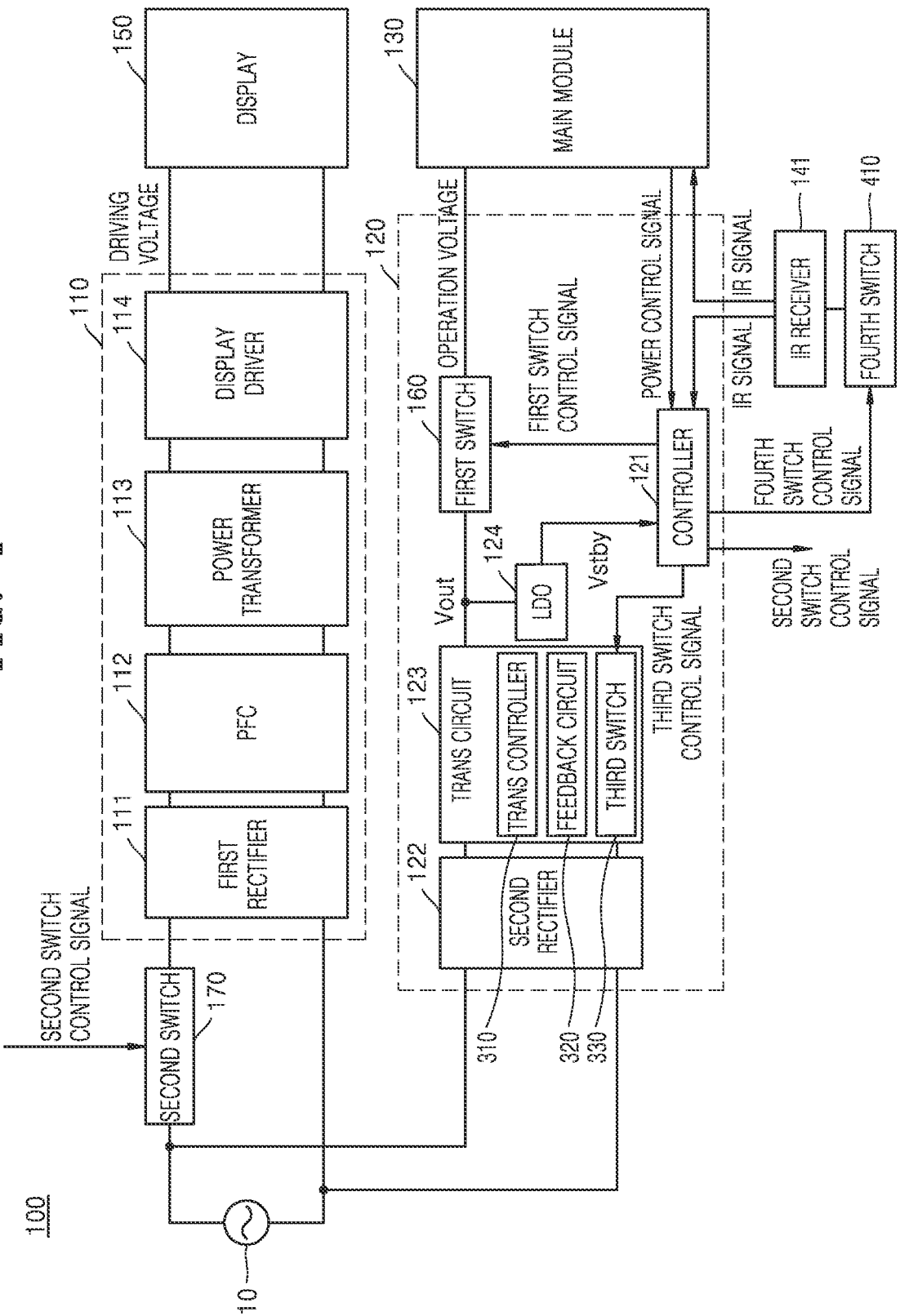
FIG. 4 is a block diagram illustrating an example configuration of a power supply and a standby power supply of a display apparatus, according to an embodiment of the disclosure.

FIG. 4 is a block diagram illustrating an example configuration of a power supply and a standby power supply of a display apparatus, according to an embodiment of the disclosure.

Referring to FIG. 4, the display apparatus 100 may include the power supply 110, the standby power supply 120, the main module 130, the IR receiver 141, the display 150, the first switch 160 and the second switch 170. Furthermore, in an embodiment of the disclosure, the display apparatus 100 may further include a fourth switch 410.

The fourth switch 410 may deliver, to the IR receiver 141, an operation voltage (e.g., Vcc) to operate the IR receiver 141, or block the operation voltage Vcc. The fourth switch 410 may be located between the IR receiver 141 and the operation voltage. The fourth switch 410 may be closed or opened based on a fourth switch control signal, which is an on or off signal, received from the controller 121. For example, the fourth switch 410 may be closed based on the fourth switch control signal as an on signal received from the controller 121, to deliver the operation voltage to operate the IR receiver 141. For example, the fourth switch 410 may be opened based on the fourth switch control signal as an off signal received from the controller 121, to block the operation voltage for operating the IR receiver 141.

The controller 121 may control the IR receiver 141 to be operated. The controller 121 may control the fourth switch 410 to apply the operation voltage to operate the IR receiver 141.

In an embodiment of the disclosure, when the display apparatus 100 is in the normal mode, the controller 121 may send the fourth switch control signal as an on signal to the fourth switch 410 to operate the IR receiver 141.

In an embodiment of the disclosure, when the display apparatus 100 is in the standby mode, the controller 121 may repetitively output the fourth switch control signal, which is the on signal, and the fourth switch control signal, which is the off signal, to the fourth switch 410, to repetitively turn on and off the IR receiver 141 at regular intervals. The operation of repetitively turning on and off the IR receiver 141 consumes less power than in a case that the IR receiver 141 constantly remains in the on state, thereby minimizing/reducing the standby power consumption of the display apparatus 100 in the standby mode.

In an embodiment of the disclosure, the IR receiver 141 may successively receive a plurality of IR signals based on inputs of the user. For example, the IR receiver 141 may successively receive a first turn-on command and a second turn-on command (see 615 of FIG. 6).

In an embodiment of the disclosure, when the display apparatus 100 is in the standby mode, the controller 121 may receive the first turn-on command for the display apparatus 100 from the IR receiver 141. While the controller 121 is operating the IR receiver 141 through the fourth switch control signal as an on signal in the standby mode, the controller 121 may receive the first turn-on command through the IR receiver 141.

In an embodiment of the disclosure, the controller 121 may send the fourth switch control signal as an on signal to the fourth switch 410 to constantly supply the operation power to the IR receiver 141, based on the first turn-on command.

In an embodiment of the disclosure, based on receiving the second turn-on command for the display apparatus 100 from the IR receiver 141 that is turned on, the controller 121 may perform a series of operations to operate the display apparatus 100 in the standby mode. For example, the controller 121 may prevent and/or reduce power consumption of the main module 130 by outputting the first switch control signal to the first switch 160, and prevent and/or reduce power consumption of the power supply 110 by outputting the second switch control signal to the second switch 170.

Figure 5:
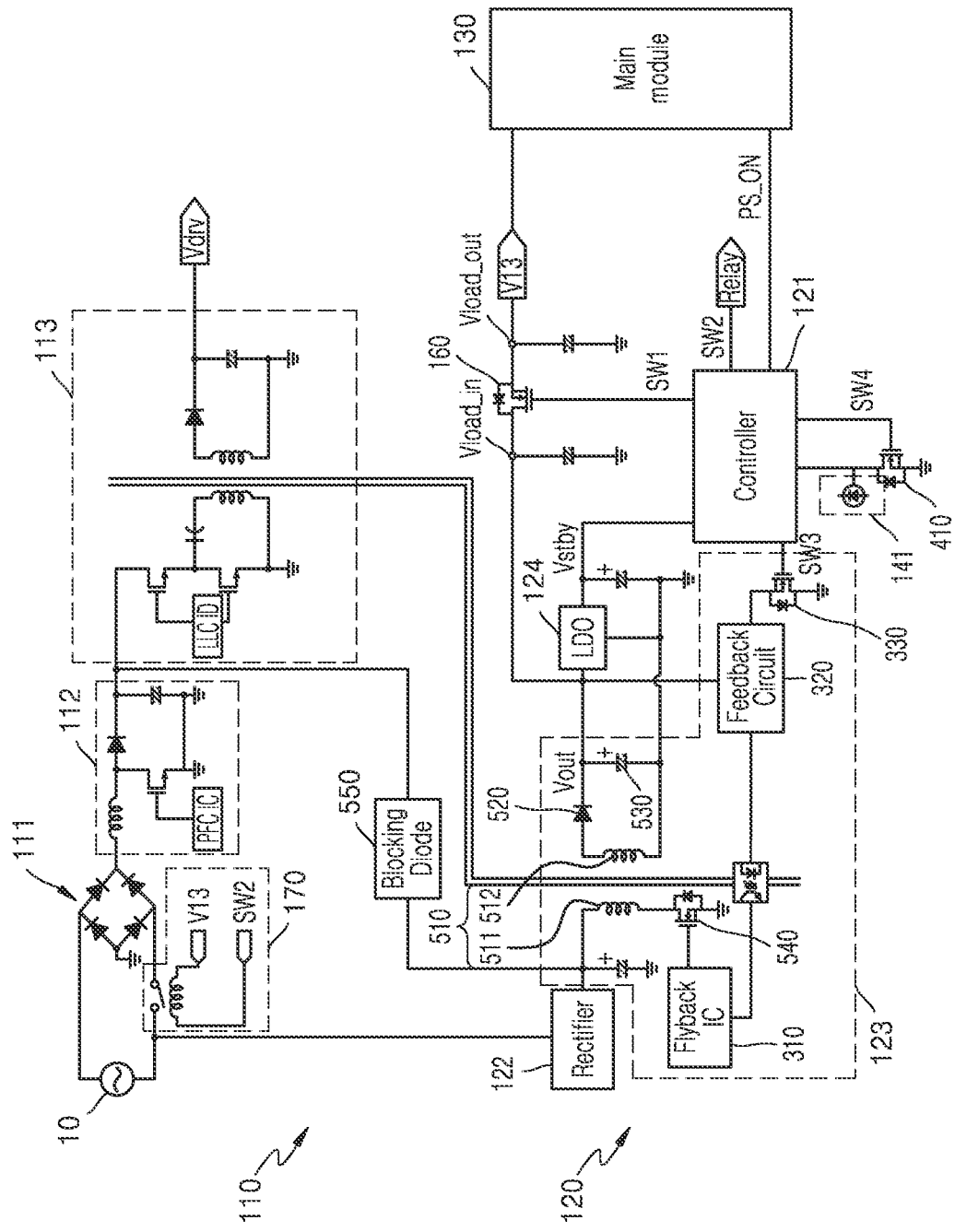
FIG. 5 is a circuit diagram illustrating an example configuration of a display apparatus, according to an embodiment of the disclosure.

FIG. 5 is a circuit diagram illustrating an example configuration of a display apparatus, according to an embodiment of the disclosure.

Referring to FIG. 5, the display apparatus 100 may include the power supply 110, the standby power supply 120, the main module 130, the IR receiver 141, the display 150, the first switch 160, the second switch 170, the third switch 330 and the fourth switch 410. In an embodiment of the disclosure, the display apparatus 100 may include the controller (e.g., including circuitry) 121 located on the secondary side.

The standby power supply 120 may include the second rectifier 122, the trans circuit 123, the LDO regulator 124 and the controller 121.

The second rectifier 122 may rectify the power received from the external power source 10. The second rectifier 122 may convert the received AC power to DC power. For example, the second rectifier 122 may be implemented with bridge diodes.

The trans circuit 123 may regulate the DC power output from the second rectifier 122 and supply a voltage of a constant level to each component such as the controller 121, the main module 130, etc. The trans circuit 123 may include a transformer 510, a rectifying diode 520, a smoothing capacitor 530, the trans controller 310, the feedback circuit 320 and the third switch 330. The feedback circuit 320 may be located on the secondary side while the trans controller 310 and the third switch 330 may be located on the primary side.

The transformer 510 may have the primary side and the secondary side isolated from each other. The transformer 510 may include primary winding 511, and secondary winding 512 to which a certain voltage is induced by the primary winding 511. The rectifying diode 520 may rectify the voltage inducted to the secondary winding 512, and the smoothing capacitor 530 may smooth the output voltage Vout output through the rectifying diode 520. The output voltage Vout output through the rectifying diode 520 may be applied to the feedback circuit 320, and the feedback circuit 320 may provide a feedback signal to the trans controller 310 based on the output voltage Vout. The trans controller 310 may adjust an on/off duty ratio of the switch 540 based on the feedback signal received from the feedback circuit 320. For example, the trans controller 310 may output a switching control signal with a long duty ratio to the switch 540, when the output voltage Vout is determined to be higher than a preset voltage. The trans controller 310 may output a switching control signal with a short duty ratio to the switch 540, when the output voltage Vout is determined to be lower than the preset voltage.

The LDO regulator 124 may output the standby voltage Vstby with an input of the output voltage Vout received from the trans circuit 123. For example, the output voltage Vout may be about 13 V, and the standby voltage Vstby may be about 3.3 V. The LDO regulator 124 may apply the standby voltage Vstby to the controller 121, and the controller 121 may operate in the standby mode at the standby voltage Vstby.

The first switch 160 may deliver the output voltage Vout received from the trans circuit 123 to the main module 130. The first switch 160 may be located between a terminal of the input voltage Vload_in and a terminal of the output voltage Vload_out. The first switch 160 may be a load switch that blocks non-used voltage to reduce consumption of the standby power in the standby mode. The load switch may refer to a switch for blocking voltage to keep the display apparatus 100 in the standby mode. The first switch 160 may include various switching devices. For example, the first switch 160 may include a field effect transistor (FET), a bipolar junction transistor (BJT) device, etc., without being limited thereto.

The first switch 160 may be controlled by a first switch control signal SW1 of the controller 121. When the first switch 160 is turned on, the output voltage Vout may be delivered to the main module 130, and when the first switch 160 is turned off, the output voltage Vout may not be delivered to the main module 130.

In an embodiment of the disclosure, when the first switch 160 is turned on, an inrush current may occur. The inrush current refers to an excessive charging current that occurs to charge an output capacitor when the load switch is turned on. When the inrush current occurs, it grows overly higher than a current commonly used, which may damage the load switch. Accordingly, the controller 121 may contain the inrush current through soft start control, in a case that the controller 121 outputs the first switch control signal SW1 as an on signal to the first switch 160. For example, the soft start control may refer to an operation of the controller 121 gradually increasing the amount of the first switch control signal SW1 to be delivered to the first switch 160. For example, to turn on the first switch 160, the controller 121 may control the turn-on period of the first switch 160 to increase stepwise (see normal mode 660 in 640 of FIG. 6).

The second switch 170 may be located between the external power source 10 and the power supply 110. The second switch 170 may be a relay that blocks the voltage to reduce consumption of the standby power of the power supply 110 in the standby mode. The relay may be turned on by magnetic force caused by a coil in which a current flows when receiving certain power. The second switch 170 may be controlled by a second switch control signal SW2 of the controller 121. When the second switch 170 is turned on, power may be supplied to the power supply 110. When the second switch 170 is turned off, power is not supplied to the power supply 110, which is physically cut off, so there may be no consumption of the standby power. For example, power may not be supplied to circuits that form the first rectifier 111, the PFC 112 and the power transformer 113.

In an embodiment of the disclosure, when the display apparatus 100 is switched into the normal mode from the standby mode, the controller 121 needs to turn on the feedback circuit 320 and then turn on the second switch 170. The coil of the second switch 170 may produce magnetic force in response to receiving the output voltage Vout of the trans circuit 123. The output voltage Vout of the trans circuit 123 may be different from the preset voltage until the feedback operation of the feedback circuit 320 is completed. Hence, when the second switch control signal as an on signal is provided to the second switch 170 before completion of the feedback operation, the second switch 170 may malfunction without being turned on.

The third switch 330 may be located between the feedback circuit 320 and the operation voltage of the feedback circuit 320 and controlled by the controller 121. The controller 121 may block the operation voltage to the feedback circuit 320 through the third switch 330 to reduce consumption of the standby power in the standby mode. The third switch 330 may be controlled by a third switch control signal SW3 of the controller 121. When the third switch 330 is turned on, the feedback circuit 320 may be turned on, and when the third switch 330 is turned off, the feedback circuit 320 may be turned off. The third switch control signal SW3 may be referred to as a wake-up signal.

The fourth switch 410 may be located between the IR receiver 141 and the operation voltage (e.g., Vcc) of the IR receiver 141 and controlled by the controller 121. The fourth switch 410 may be controlled by a fourth switch control signal SW4 of the controller 121. When the fourth switch 410 is turned on, the IR receiver 141 may be turned on, and when the fourth switch 410 is turned off, the IR receiver 141 may be turned off. In an embodiment of the disclosure, when the display apparatus 100 is in the standby mode, the controller 121 may repetitively provide on and off signals to the fourth switch 410 to control the IR receiver 141 to operate (see a standby mode 670 in 620 of FIG. 6).

The controller 121 may operate at the standby voltage Vstby received from the LDO regulator 124. The controller 121 may control the IR receiver 141 to be operated, based on the standby voltage Vstby. The controller 121 may receive the turn-on command for the display apparatus 100 through the IR receiver 141, and perform a series of operations to switch into the normal mode from the standby mode. The controller 121 may receive the turn-off command for the display apparatus 100 through the IR receiver 141, and perform a series of operations to switch into the standby mode from the normal mode. The controller 121 may be implemented as a micro control unit (MCU), but is not limited thereto.

When the display apparatus 100 is in the normal mode, the first power supply 110, the main module 130, the standby power supply 120, the feedback circuit 320, the IR receiver 141, the first switch 160, the second switch 170, the third switch 330 and the fourth switch 410 may be turned on.

When the display apparatus 100 is in the standby mode, the first power supply 110, the main module 130, the feedback circuit 320, the first switch 160, the second switch 170 and the third switch 330 may be turned off. In the standby mode, the standby power supply 120, the IR receiver 141 and the fourth switch 410 may be turned on. The power supply 110, the feedback circuit 320 and the main module 130 do not operate in the standby mode, thereby minimizing/reducing standby power consumption.

When the PFC 112 operates as the power supply 110 is turned on in the standby mode, DC power subjected to PF correction may be delivered to the trans circuit 123 through a blocking diode 550. For example, as the voltage of the trans circuit 123 is converted to the DC power of the PFC 112, the power system quality may be maintained. For example, the PFC 112 may have DC power having voltage and current be in phase. For example, the trans circuit 123 may have DC power having voltage and current be out of phase, and may convert the DC power to power having voltage and current be in phase based on the DC power received from the PFC 112.

The circuit configuration of the display apparatus 100 as shown in FIG. 5 is an example, without being limited thereto. Especially, the circuit configuration of the power supply 110 may convert AC power to DC power, and may be replaced by any type of circuit that is able to generate power required for each component of the display apparatus 100.

Figure 6:
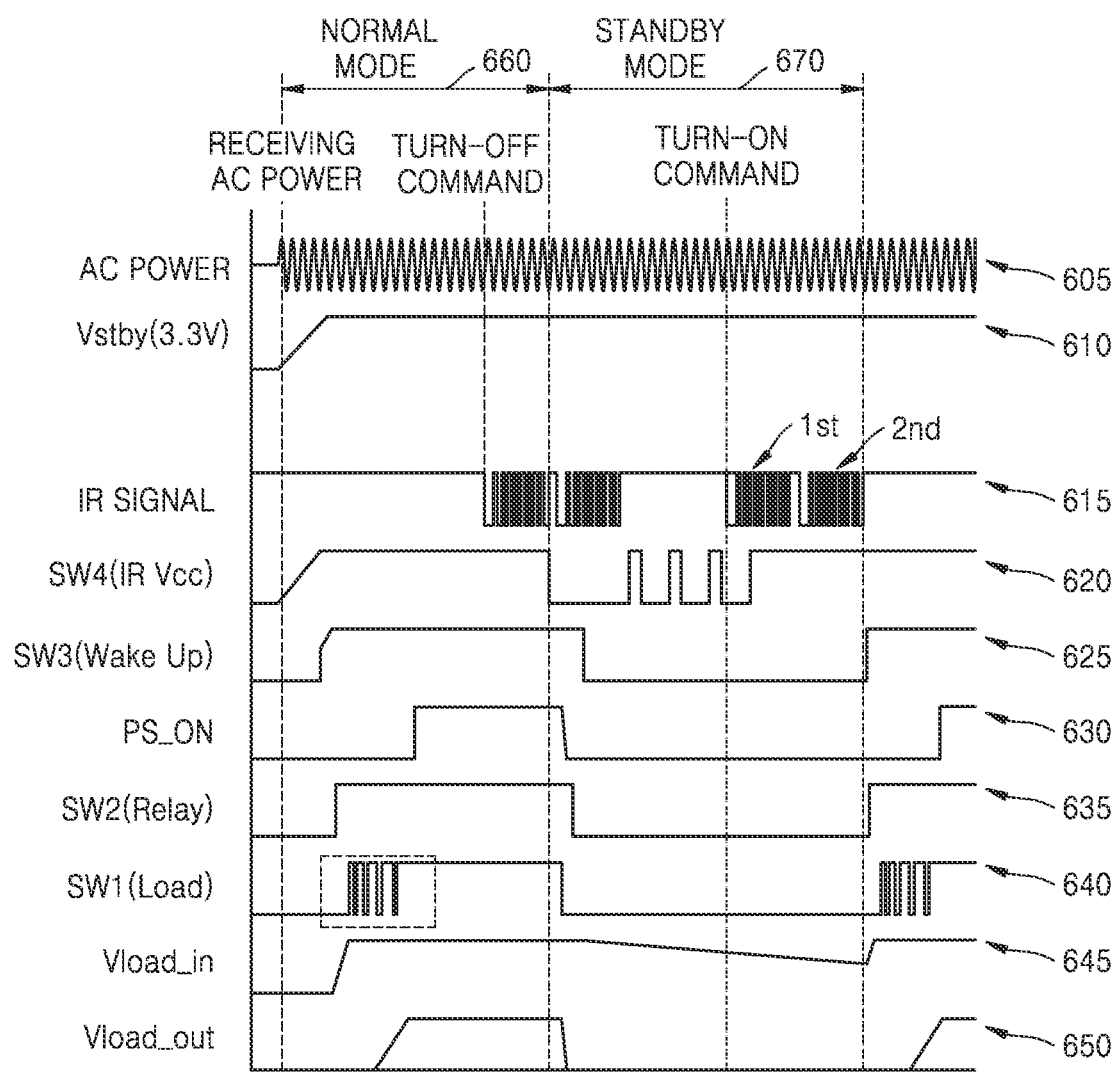
FIG. 6 is a timing diagram illustrating timing of each signal in a normal mode and a standby mode of a display apparatus, according to an embodiment of the disclosure.

FIG. 6 is a timing diagram illustrating timing of each signal in a normal mode and a standby mode of a display apparatus, according to an embodiment of the disclosure. FIG. 6 will be described in conjunction with FIG. 5.

In 605 of FIG. 6, the display apparatus 100 may receive AC power when connected to the external power source 10.

In 610 of FIG. 6, when the external power source 10 is connected to the display apparatus 100, the standby power supply 120 may operate and generate the standby power Vstby. For example, the standby power Vstby may be about 3.3 V, but is not limited thereto.

In 615 of FIG. 6, the IR receiver 141 may receive an IR signal of a turn-off command in the normal mode 660. Furthermore, the IR receiver 141 may receive an IR signal of a turn-on command in the standby mode 670. The IR receiver 141 may receive the IR signal at least two times through one user input. For example, the IR receiver 141 may receive a first turn-on command 1st and a second turn-on command 2nd.

In 620 of FIG. 6, the controller 121 may output the fourth switch control signal SW4 as an on signal to the fourth switch 410 in the normal mode 660. The fourth switch 410 may be turned on in the normal mode 660. Furthermore, the controller 121 may repetitively output the fourth switch control signal SW4, the on and off signals to the fourth switch 410 in the standby mode 670.

In 625 of FIG. 6, the controller 121 may output the third switch control signal SW3 as an on signal to the third switch 330 in the normal mode 660. The third switch 330 may be turned on in the normal mode 660. Furthermore, the controller 121 may output the third switch control signal SW3 as an off signal to the third switch 330 in the standby mode 670. The third switch 330 may be turned off in the standby mode 670.

In 630 of FIG. 6, the controller 121 may receive the power control signal PS_ON as an on signal from the main module 130 in the normal mode 660. The controller 121 may receive the power control signal PS_ON as an off signal from the main module 130 in the standby mode 670.

In 635 of FIG. 6, the controller 121 may output the second switch control signal SW2 as an on signal to the second switch 170 in the normal mode 660. The second switch 170 may be turned on in the normal mode 660. Furthermore, the controller 121 may output the second switch control signal SW2 as an off signal to the second switch 170 in the standby mode 670. The second switch 170 may be turned off in the standby mode 670.

In 640 of FIG. 6, the controller 121 may output the first switch control signal SW1 as an on signal to the first switch 160 in the normal mode 660. The first switch 160 may be turned on in the normal mode 660. Furthermore, the controller 121 may output the first switch control signal SW1 as an off signal to the first switch 160 in the standby mode 670. The first switch 160 may be turned off in the standby mode 670.

The controller 121 may contain an inrush current through soft start control, in a case that the controller 121 outputs the first switch control signal SW1 as an on signal to the first switch 160. For example, the controller 121 may perform an operation 641 of gradually increasing the amount of the first switch control signal SW1 (641) to be delivered to the first switch 160.

In 645 and 650 of FIG. 6, input voltage Vload_in to the first switch 160 in the normal mode 660 may be equal to the output voltage Vout of the trans circuit 123 that operates based on the external power source 10. Furthermore, as the first switch 160 is turned on in the normal mode 660, output voltage Vload_out of the first switch 160 may be equal to the input voltage Vload_in. As the feedback circuit 320 is turned off in the standby mode 670 and thus the output voltage Vout is smaller than a range of the preset voltage, the input voltage Vload_in of the first switch 160 may be reduced. In the standby mode 670, the first switch 160 is turned off, so the output voltage Vload_out of the first switch 160 may be about 0 V.

In an embodiment of the disclosure, the controller 121 may receive the turn-off command for the display apparatus 100 through the IR receiver 141 in the normal mode 660. Furthermore, the main module 130 may receive the turn-off command for the display apparatus 100 through the IR receiver 141 in the normal mode 130. The main module 130 may store a current state being worked on in the memory as it is, and may provide the power control signal PS_ONas an off signal to operate the controller 121 in the standby mode. On receiving the power control signal PS_ONas an off signal, the controller 121 may output the first switch control signal SW1 as an off signal to the first switch 160 to block supplying of the output voltage Vout delivered to the main module 130. The controller 121 may output the second switch control signal SW2 as an off signal to the second switch 170 to block supplying of the external power from the external power source 10 delivered to the power supply 110. The controller 121 may output the third switch control signal SW3 as an off signal to the third switch 330 to turn off the feedback circuit 320.

In an embodiment of the disclosure, the controller 121 may receive the turn-on command for the display apparatus 100 through the IR receiver 141 in the standby mode 670. The controller 121 may output a wake-up signal to turn on the feedback circuit 320. For example, the controller 121 may output the third switch control signal SW3 as an on signal to the third switch 330. The controller 121 may output the second switch control signal SW2 as an on signal to the second switch 170 to turn on the power supply 110. The controller 121 may output the first switch control signal SW1 as an on signal to the first switch 160 to turn on the main module 130. The controller 121 may receive the power control signal PS_ONas an on signal from the turned-on main module 130 to operate in the normal mode.

An operation of operating the display apparatus 100 in the standby mode in response to receiving the turn-off command in the normal mode will now be described in greater detail below with reference to FIGS. 7 and 8.

Figure 7:
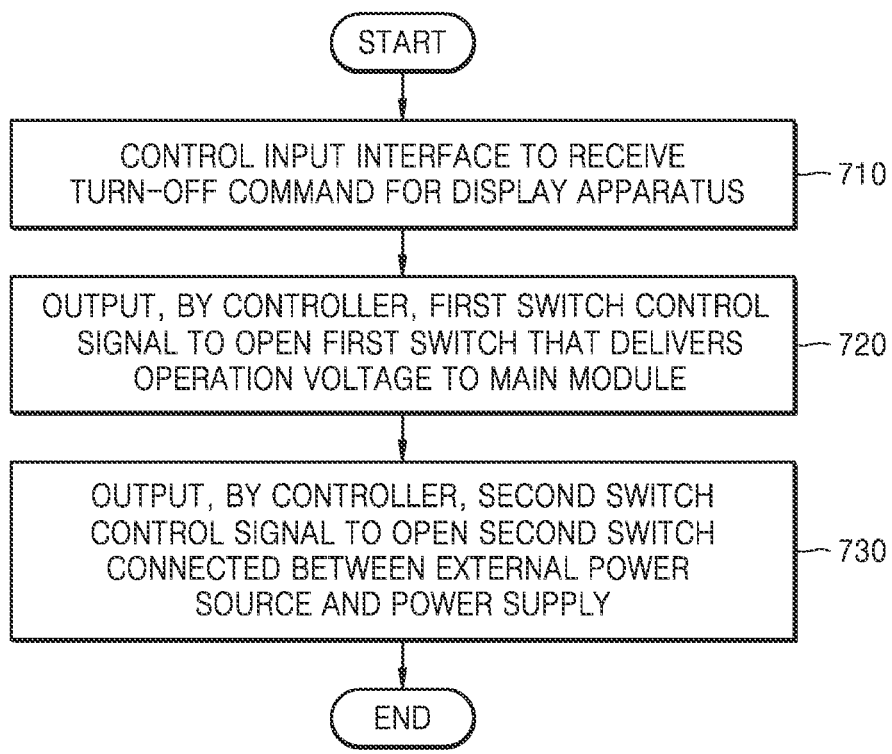
FIG. 7 is a flowchart illustrating an example operation of a display apparatus switching to a standby mode from a normal mode, based on reception of a turn-off command, according to an embodiment of the disclosure.

FIG. 7 is a flowchart illustrating an example operation of a display apparatus switching to a standby mode from a normal mode, based on reception of a turn-off command, according to an embodiment of the disclosure.

Referring to FIG. 7, in operation 710, the display apparatus 100 may control the input interface 140 to receive the turn-off command for the display apparatus 100.

In an embodiment of the disclosure, the display apparatus 100 may generate, through the trans circuit 123, an operation voltage for the main module 130 from the external power source 10. Furthermore, the display apparatus 100 may generate, through a regulator (e.g., the LDO regulator 124), a standby voltage lower than the operation voltage based on the operation voltage. In an embodiment of the disclosure, the main module 130 may operate at the operation voltage. In an embodiment of the disclosure, the controller 121 may operate at the standby voltage. The standby power supply 120 including the trans circuit 123 and the LDO regulator 124 may operate as a separate configuration from the power supply 110 that generates a voltage to operate the display apparatus 100 from the external power supply 10.

For example, the main module 130 that operates at the operation voltage may control the input interface 140 to receive the turn-off command for the display apparatus 100. The main module 130 may store a current state being worked on in the memory as it is, based on receiving the turn-off command for the display apparatus 100. For example, the main module 130 may control the input interface 140 by the at least one processor included in the main module 130 executing one or more instructions stored in the memory.

Furthermore, for example, the controller 121 that operates at the standby voltage may control the input interface 140 to receive the turn-off command for the display apparatus 100.

In the normal mode, the input interface 140 may be controlled by the main module 130 and may forward the turn-off command to the main module 130. Furthermore, in the normal mode, the input interface 140 may be controlled by the controller 121 and may forward the turn-off command to the controller 121. In the meantime, as will be described later in connection with FIGS. 9 and 10, as the main module 130 does not operate in the standby mode, it may not receive the turn-on command for the display apparatus 100 from the input interface 140. In the standby mode, the display apparatus 100 may receive the turn-on command for the display apparatus 100 from the input interface 140 under the control of the controller 121.

The input interface 140 may receive the turn-on command or the turn-off command for the display apparatus 100. For example, the input interface 140 may be the IR receiver 141 and the turn-on command or turn-off command may be an IR signal, without being limited thereto. For example, the input interface 140 may be a key pad or a function key such as a power button, and the turn-on command or turn-off command may be a function key signal.

On receiving the turn-off command, the input interface 140 may forward the turn-off command to each of the main module 130 and the controller 121. In the meantime, as will be described in greater detail below with reference to FIGS. 9 and 10, the input interface 140 may forward the turn-on command to the controller 121 in the standby mode.

In operation 720, the controller 121 may output the first switch control signal SW1 to open the first switch 160 that delivers the operation voltage to operate the main module 130 to the main module 130, based on the turn-off command. The first switch control signal SW1 may be a signal to turn off the first switch 160.

For example, the controller 121 may output a control signal to turn off the main module 130. The controller 121 may provide the first switch control signal SW1 as an off signal to the first switch 160 to block the operation power from being supplied to the main module 130. For example, the controller 121 may not provide the output voltage generated by the trans circuit 123 to the main module 130. Accordingly, power consumption from operation of the main module 130 may be minimized and/or reduced in the standby mode.

For example, the first switch 160 may be a load switch that blocks non-used voltage to reduce consumption of the standby power in the standby mode. The first switch 160 may include an FET, a BJT device, etc., without being limited thereto.

In operation 730, the controller 121 may output the second switch control signal SW2 to open the second switch 170 connected between the external power source 10 and the power supply 110 for generating power to be supplied to the display apparatus 100 from the external power source 10. The second switch control signal SW2 may be a signal to turn off the second switch 170.

For example, the controller 121 may output a control signal to turn off the power supply 110. The controller 121 may provide the second switch control signal SW2 as an off signal to the second switch 170 to block supplying of the external power from the external power source 10 to the power supply 110. Accordingly, power consumption from operation of the power supply 110 may be minimized and/or reduced in the standby mode.

For example, the second switch 170 may be a relay that blocks voltage to reduce consumption of the standby power of the power supply 110 in the standby mode.

In an embodiment of the disclosure, the display apparatus 100 may control to turn off other components than the input interface 140 and the controller 121 in the standby mode. For example, the display apparatus 100 may control to turn off the components of the power supply 110 and the main module 130 through the controller 121. For example, the power supply 110, the main module 130 and the feedback circuit 320 may be turned off in the standby mode. Accordingly, in the standby mode of the display apparatus 100, the input interface 140 and the controller 121 are the key components that consume power. The controller 121 may identify whether the turn-on command for the display apparatus 100 is received from the input interface 140 in the standby mode, thereby minimizing/reducing the standby power consumed to operate the power supply 110 and/or the main module 130.

Figure 8:
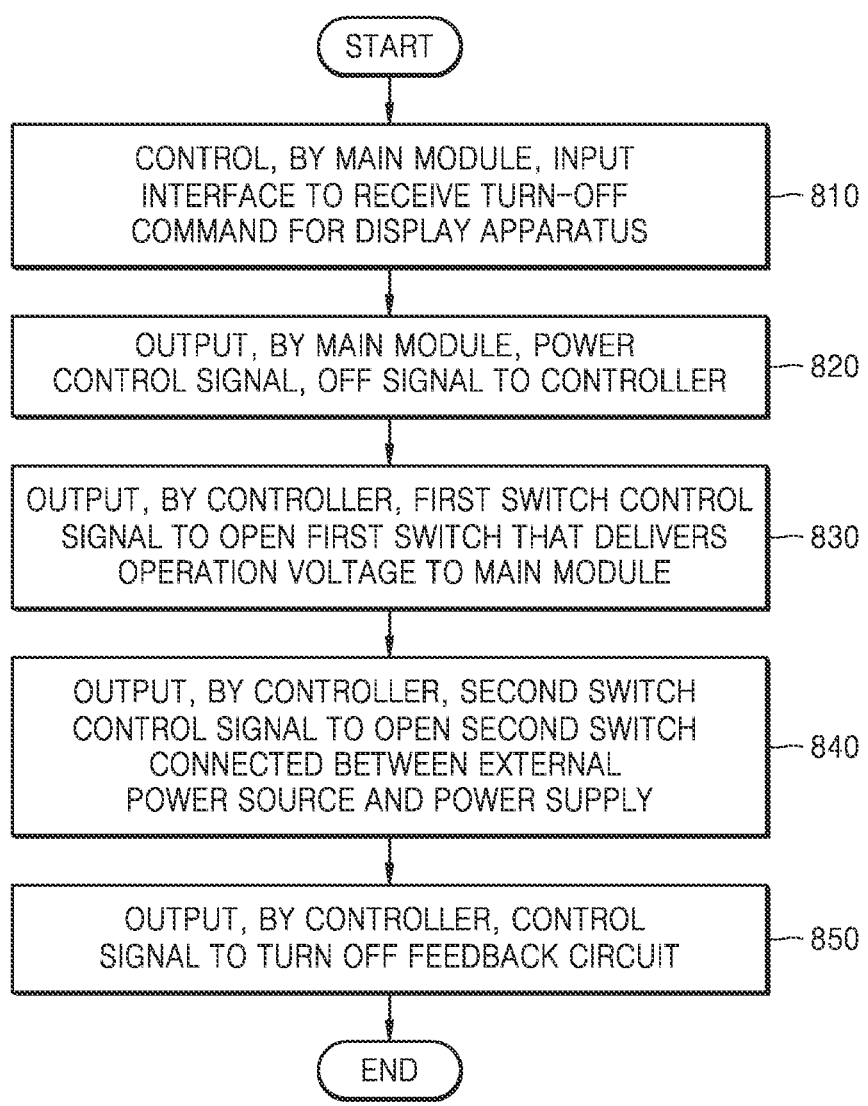
FIG. 8 is a flowchart illustrating an example operation of a display apparatus switching to a standby mode from a normal mode, based on reception of a turn-off command, according to an embodiment of the disclosure.

FIG. 8 is a flowchart illustrating an example operation of a display apparatus switching to a standby mode from a normal mode, based on reception of a turn-off command, according to an embodiment of the disclosure.

Referring to FIG. 8, in operation 810, the display apparatus 100 may control the input interface 140 to receive the turn-off command for the display apparatus 100. Operation 810 may correspond to operation 710 of FIG. 7.

For example, the main module 130 that operates at the operation voltage may control the input interface 140 to receive the turn-off command for the display apparatus 100. The main module 130 may store a current state being worked on in the memory as it is, based on receiving the turn-off command for the display apparatus 100.

Furthermore, for example, the controller 121 that operates at the standby voltage may control the input interface 140 to receive the turn-off command for the display apparatus 100.

In operation 820, the main module 130 may output the power control signal PS_ON as an off signal to the controller 121. For example, the main module 130 may output, through the at least one processor to the controller 121, the power control signal PS_ON as an off signal for the display apparatus 100 to switch into the standby mode from the normal mode. On receiving the power control signal PS_ON as an off signal, the controller 121 may perform operations 830, 840 and 850 to minimize and/or reduce standby power.

In an embodiment of the disclosure, when the controller 121 receives the turn-off command from the input interface 140, operation 820 may be omitted.

In operation 830, the controller 121 may output the first switch control signal SW1 to open the first switch 160 that delivers the operation voltage to operate the main module 130 to the main module 130, based on the turn-off command. The first switch control signal SW1 may be a signal to turn off the first switch 160.

For example, the controller 121 may provide the first switch control signal SW1 as an off signal to the first switch 160 to block the operation power from being supplied to the main module 130. For example, the controller 121 may not provide the output voltage generated by the trans circuit 123 to the main module 130. Accordingly, power consumption from operation of the main module 130 may be minimized and/or reduced in the standby mode.

In operation 840, the controller 121 may output the second switch control signal SW2 to open the second switch 170 connected between the external power source 10 and the power supply 110 for generating power to be supplied to the display apparatus 100 from the external power source 10 based on outputting the first switch control signal SW1. The second switch control signal SW2 may be a signal to turn off the second switch 170.

For example, the controller 121 may provide the second switch control signal SW2 as an off signal to the second switch 170 to block supplying of the external power from the external power source 10 to the power supply 110. Accordingly, power consumption from operation of the power supply 110 may be minimized and/or reduced in the standby mode.

In operation 850, the controller 121 may output a control signal to turn off the feedback circuit 320. The controller 121 may block the operation voltage to the feedback circuit 320 to reduce consumption of the standby power in the standby mode.

When the output voltage output from the trans circuit 123 is out of a range of the preset voltage, the feedback circuit 320 may output a feedback signal to the trans controller 310. For example, when the output voltage of the trans circuit 123 is different from the operation voltage of the main module 130, the feedback circuit 320 may output a feedback signal to the trans controller 310. For example, the controller 121 may cut off operation of the feedback circuit 320 that identifies whether the output voltage is equal to the operation voltage of the main module 130.

For example, the controller 121 may output the third switch control signal SW3 to the third switch 330 to open the third switch 330 that delivers the operation voltage to the feedback circuit 320. The third switch control signal SW3 may be a signal to turn off the third switch 330.

As the feedback circuit 320 is turned off, the trans controller 310 may operate in a burst method. For example, the trans controller 310 may increase the standby power efficiency by reducing on/off switching frequency of the switch 540 per unit time according to the burst method.

In an embodiment of the disclosure, the display apparatus 100 may control to turn off other components than the input interface 140 and the controller 121 in the standby mode. For example, the display apparatus 100 may control to turn off the components of the power supply 110, the main module 130 and the feedback circuit 320 through the controller 121. For example, the power supply 110, the main module 130 and the feedback circuit 320 may be turned off in the standby mode. The controller 121 may identify whether the turn-on command for the display apparatus 100 is received from the input interface 140 in the standby mode, thereby minimizing/reducing the standby power consumed to operate the power supply 110 and/or the main module 130.

Furthermore, as the controller 121 does not provide the output voltage Vout generated through the trans circuit 123 to the main module 130 in the standby mode, the controller 121 may cut off the operation of the feedback circuit 320 that identifies whether the output voltage Vout is equal to a preset voltage, e.g., the operation voltage of the main module 130. Accordingly, the display apparatus 100 may minimize and/or reduce the standby power consumed from operation of the feedback circuit 320.

In the standby mode, the controller 121 may repetitively output the fourth switch control signal SW4 as an off signal to open the fourth switch 410 that delivers the operation power to operate the input interface 140 and the fourth switch control signal SW4 as an on signal to close the fourth switch 410. Hence, the controller 121 may control the input interface 140 to be repetitively turned on and off. The operation of repetitively turning on and off the input interface 140 consumes less power than in a case that the input interface 140 constantly remains in the on state, thereby minimizing/reducing the standby power consumption of the display apparatus 100 in the standby mode.

A series of procedures in which the display apparatus 100 operates in the normal mode in response to receiving the turn-on command in the standby mode will now be described in greater detail below with reference to FIGS. 9, 10 and 11.

Figure 9:
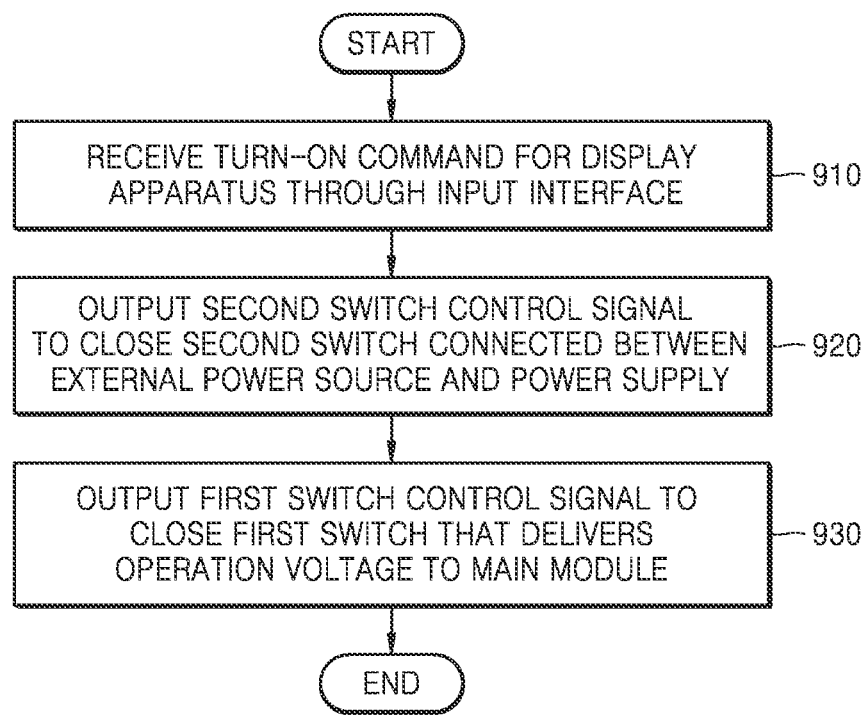
FIG. 9 is a flowchart illustrating an example operation of a display apparatus switching to a normal mode from a standby mode, based on reception of a turn-on command, according to an embodiment of the disclosure.

FIG. 9 is a flowchart illustrating an example operation of a display apparatus switching to a normal mode from a standby mode, based on reception of a turn-on command, according to an embodiment of the disclosure.

Referring to FIG. 9, in operation 910, the controller 121 may receive a turn-on command for the display apparatus 100 through the input interface 140. For example, as the main module 130 is turned off and does not operate in the standby mode, the main module 130 may not receive the turn-on command through the input interface 140.

For example, the power supply 110, the main module 130 and the feedback circuit 320 may be turned off in the standby mode. For example, the controller 121 and the input interface 140 may be turned on in the standby mode. For example, being switched from the standby mode to the normal mode, the power supply 110, the main module 130 and the feedback circuit 320 may be switched into the on state.

In operation 920, the controller 121 may output the second switch control signal SW2 to close the second switch 170 connected between the external power source 10 and the power supply 110. The controller 121 may provide the second switch control signal SW2 as an on signal to the second switch 170. The turned-on second switch 170 may deliver the external power from the external power source 10 to the power supply 110. The controller 121 may control the external power from the external power source 10 to be supplied to the power supply 110. For example, the second switch 170 may be a relay that blocks voltage to reduce consumption of the standby power of the power supply 110 in the standby mode.

In operation 930, the controller 121 may output the first switch control signal SW1 to close the first switch 160 that delivers the operation voltage to the main module 130. The controller 121 may provide the first switch control signal SW1 as an on signal to the first switch 160. The turned-on second switch 160 may deliver the operation voltage to the main module 130. The controller 121 may control the operation power to be supplied to the main module 130. For example, the first switch 160 may be a load switch that blocks non-used voltage to reduce consumption of the standby power in the standby mode.

In an embodiment of the disclosure, the display apparatus 100 may generate, through the trans circuit 123, the operation voltage for the main module 130 from the external power source 10. For example, the operation voltage may be equal to the output voltage Vout generated from the trans circuit 123 of the power supply 120. Furthermore, the display apparatus 100 may generate, through a regulator (e.g., the LDO regulator 124), a standby voltage lower than the operation voltage based on the operation voltage. In an embodiment of the disclosure, the controller 121 may operate at the standby voltage. The standby power supply 120 including the trans circuit 123 and the LDO regulator 124 may operate as a separate configuration from the power supply 110 that generates a voltage to operate the display apparatus 100 from the external power supply 10.

Figure 10:
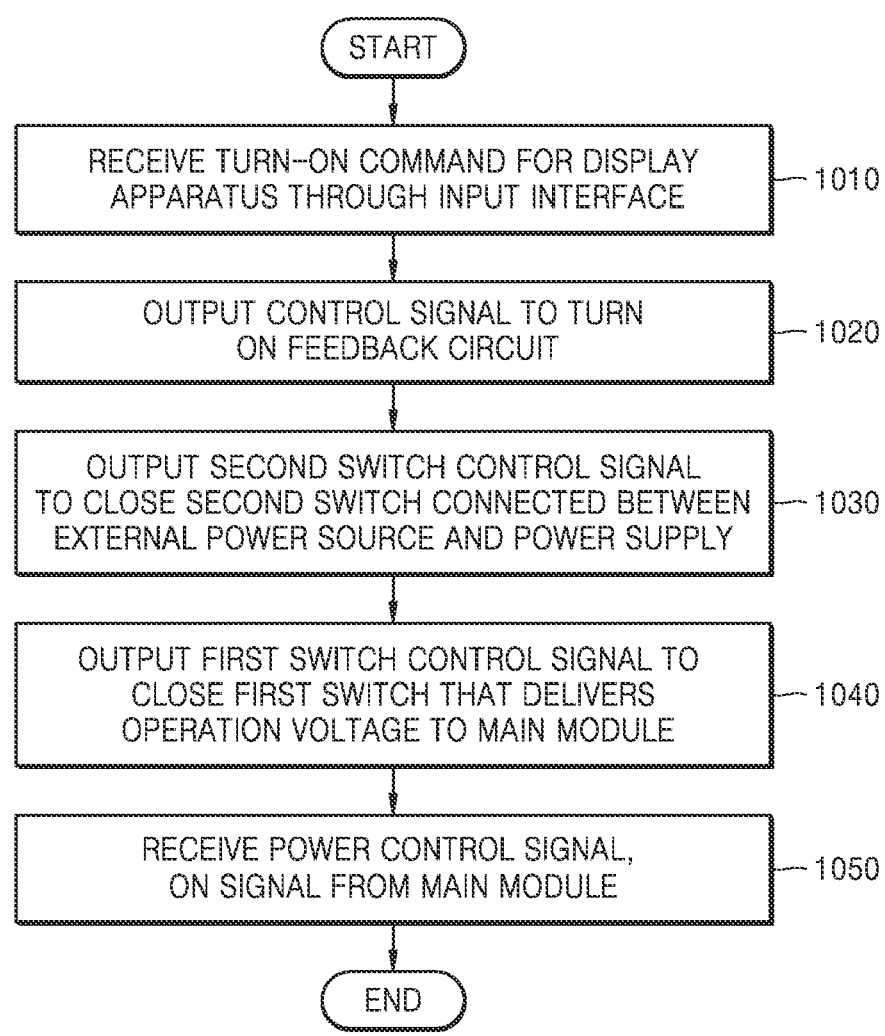
FIG. 10 is a flowchart illustrating an example operation of a display apparatus switching to a normal mode from a standby mode, based on reception of a turn-on command, according to an embodiment of the disclosure.

FIG. 10 is a flowchart illustrating an example operation of a display apparatus switching to a normal mode from a standby mode, based on reception of a turn-on command, according to an embodiment of the disclosure.

Referring to FIG. 10, in operation 1010, the controller 121 may receive the turn-on command for the display apparatus 100 through the input interface 140. For example, as the main module 130 is turned off and does not operate in the standby mode, the main module 130 may not receive the turn-on command through the input interface 140.

In operation 1020, the controller 121 may output a control signal to turn on the feedback circuit 320. When the output voltage output from the trans circuit 123 is out of a range of the preset voltage, e.g., the operation voltage of the main module 130, the turned-on feedback circuit 320 may output a feedback signal to the trans controller 310. The trans controller 310 may output a control signal to adjust an on/off duty ratio of the switch 540 of the trans circuit 123 based on the feedback signal. The trans circuit 123 may generate, through the feedback circuit 320, the output voltage Vout having the same magnitude as the operation voltage for the main module 130.

For example, the controller 121 may output the third switch control signal SW3 to the third switch 330 to close the third switch 330 that delivers the operation voltage to the feedback circuit 320. The third switch control signal SW3 may be a signal to turn on the third switch 330.

In operation 1030, the controller 121 may output the second switch control signal SW2 to close the second switch 170 connected between the external power source 10 and the power supply 110. The second switch control signal SW2 may be a signal to turn on the second switch 170.

For example, the controller 121 may output a control signal to turn on the power supply 110. The controller 121 may provide the second switch control signal SW2 as an on signal to the second switch 170 to supply the external power from the external power source 10 to the power supply 110.

In an embodiment of the disclosure, when the display apparatus 100 is switched into the normal mode from the standby mode, the controller 121 needs to turn on the feedback circuit 320 and then turn on the second switch 170. The coil of the second switch 170 may produce magnetic force in response to receiving the output voltage Vout of the trans circuit 123. The output voltage Vout of the trans circuit 123 may be different from the preset voltage until the feedback operation of the feedback circuit 320 is completed. Hence, when the second switch control signal as an on signal is provided to the second switch 170 before completion of the feedback operation, the second switch 170 may malfunction without being turned on.

In operation 1040, the controller 121 may output the first switch control signal SW1 to close the first switch 160 that delivers the operation voltage to the main module 130. The first switch control signal SW1 may be a signal to turn on the first switch 160.

For example, the controller 121 may output a control signal to turn on the main module 130. The controller 121 may provide the first switch control signal SW1 as an on signal to the first switch 160 to supply the operation power to the main module 130. For example, the controller 121 may provide the output voltage generated by the trans circuit 123 to the main module 130.

In operation 1050, based on outputting the first switch control signal SW1, the controller 121 may receive the power control signal PS_ON as an on signal from the main module 130. The main module 130 may output the power control signal PS_ON as an on signal for the display apparatus 100 to switch into the normal mode from the standby mode. For example, the display 150 may be turned on according to the power control signal PS_ON as an on signal.

Figure 11:
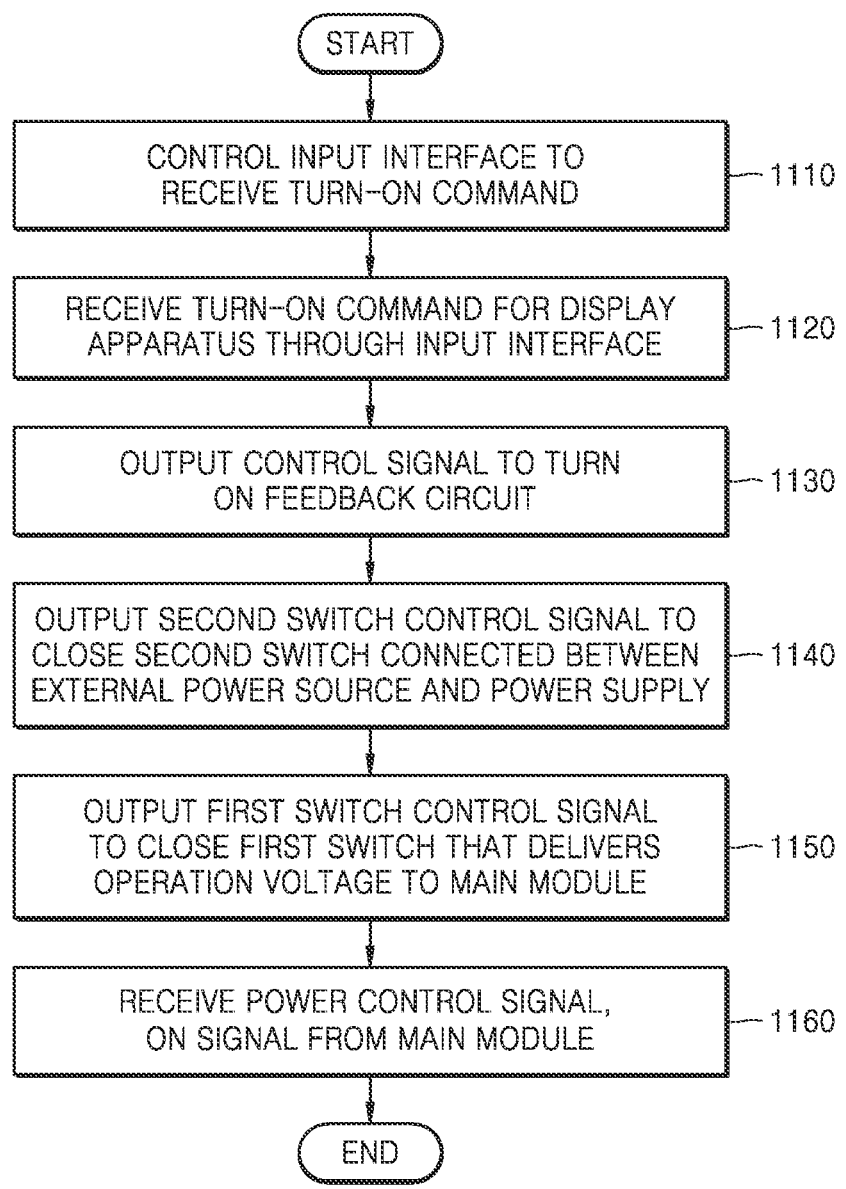
FIG. 11 is a flowchart illustrating an example operation of a display apparatus switching to a normal mode from a standby mode, based on reception of a turn-on command, according to an embodiment of the disclosure.

FIG. 11 is a flowchart illustrating an example operation of a display apparatus switching to a normal mode from a standby mode, based on reception of a turn-on command, according to an embodiment of the disclosure.

Referring to FIG. 11, in operation 1110, the controller 121 may control the input interface 140 to receive the turn-on command for the display apparatus 100. The controller 121 is turned on in the standby mode, and may thus be controlled not by the main module 130 but by the controller 121.

The controller 121 may control the input interface 140 to operate in the standby mode.

For example, the controller 121 may control the operation voltage, e.g., Vcc, for operating the input interface 140 to be delivered to the input interface 140. For example, the controller 121 may provide the fourth switch control signal as an off signal to close the fourth switch 410 to supply the operation power to the input interface 140.

Furthermore, for example, the controller 121 may supply the operation power to operate the input interface 140.

In operation 1120, the controller 121 may receive the turn-on command for the display apparatus 100 through the input interface 140. Operation 1120 may correspond to operation 1010 of FIG. 10.

In operation 1130, the controller 121 may output a control signal to turn on the feedback circuit 320. Operation 1130 may correspond to operation 1020 of FIG. 10.

In operation 1140, the controller 121 may output the second switch control signal SW2 to close the second switch 170 connected between the external power source 10 and the power supply 110. Operation 1140 may correspond to operation 1030 of FIG. 10.

In operation 1150, the controller 121 may output the first switch control signal SW1 to close the first switch 160 that delivers the operation voltage to the main module 130. Operation 1150 may correspond to operation 1040 of FIG. 10.

Figure 12:
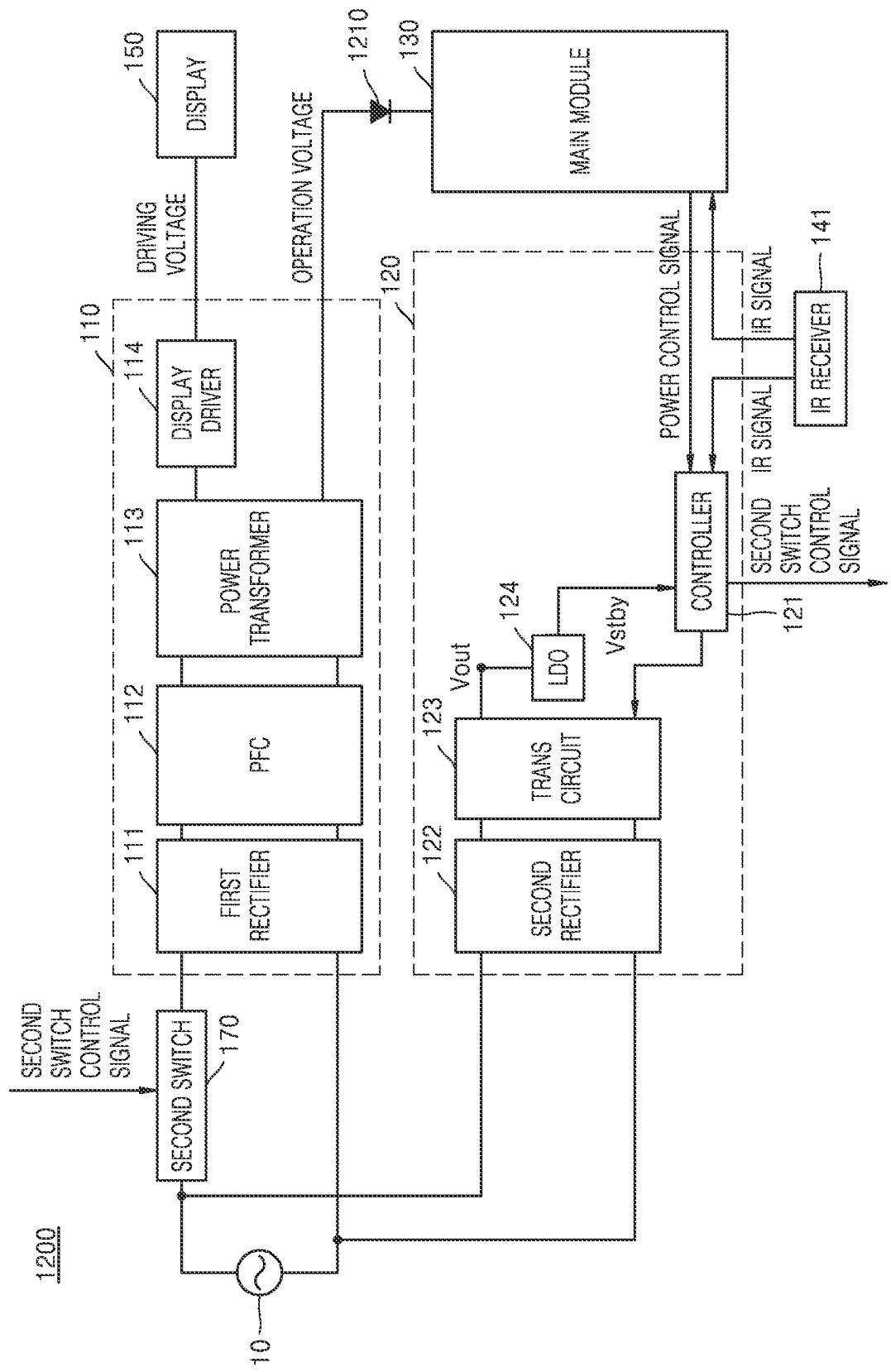
FIG. 12 is a block diagram illustrating an example configuration of a power supply and a standby power supply of a display apparatus, according to an embodiment of the disclosure.

FIG. 12 is a block diagram illustrating an example configuration of a power supply and a standby power supply of a display apparatus, according to an embodiment of the disclosure.

Referring to FIG. 12, the power supply 110 may be connected to the main module 130 through a diode 1210 in a display apparatus 1200.

In an embodiment of the disclosure, the power supply 110 may generate an operation voltage to operate the main module 130 as well as a driving voltage to drive the display 150. The power transformer 113 may regulate the DC voltage output from the PFC 112 and apply a voltage of a constant level to each component such as the main module 130 and the display 150. For example, the power transformer 113 may generate power (e.g., a driving voltage Vdrv) required to operate the display 150. For example, the power transformer 113 may generate power (e.g., an operation voltage) required to operate the main module 130.

In an embodiment of the disclosure, the main module 130 may receive the operation power from the power supply 110.

In an embodiment of the disclosure, in the display apparatus 1200, the standby power supply 120 may not generate the operation voltage to be provided to the main module 130. Even in this case, the standby power supply 120 may control to receive an IR signal through the IR receiver 141 in the standby mode.

In an embodiment of the disclosure, in the display apparatus 1200, the power supply 110 may generate an operation voltage to operate the main module 130, and the standby power supply 120 may control the IR receiver 141 to be operated to receive the turn-on command in the standby mode. Accordingly, consumption power of the controller 121 may be reduced from about 60 W to about 15 W.

In an embodiment of the disclosure, the display apparatus 100 includes the power supply 110 for supplying power from the external power source 10 to the display apparatus 100, the input interface 140 for receiving the turn-on command or the turn-off command for the display apparatus 100, the main module 130 that operates at the operation voltage, and the controller 121 that operates at the standby voltage.

In an embodiment of the disclosure, the controller 121 outputs the first switch control signal SW1 to open the first switch 160 that delivers the operation voltage to the main module 130, based on the turn-off command.

In an embodiment of the disclosure, based on outputting the first switch control signal SW1, the controller 121 outputs the second switch control signal SW2 to open the second switch 170 connected between the external power source 10 and the power supply 110.

In an embodiment of the disclosure, the display apparatus 100 may further include the feedback circuit 320 for outputting a feedback signal when the operation voltage for operating the main module 130 is out of a preset range.

In an embodiment of the disclosure, based on outputting the second switch control signal SW2, the controller 121 may output the control signal SW3 to turn off the feedback circuit 320.

In an embodiment of the disclosure, the display apparatus 100 may include the standby power supply 120 having the controller 121, the trans circuit 123 for generating the operation voltage for the main module 130 from the external power source 10 and the regulator 124 for generating from the operation voltage a standby voltage lower than the operation voltage.

In an embodiment of the disclosure, the controller 121 may receive the standby voltage from the regulator 124.

In an embodiment of the disclosure, the main module 130 may further include at least one processor, and a memory for storing one or more instructions to be executed by the at least one processor.

In an embodiment of the disclosure, the at least one processor may control the input interface 140 to receive the turn-off command for the display apparatus 100.

In an embodiment of the disclosure, the at least one processor may output, to the controller 121, the power control signal PS_ON for the display apparatus 100 to switch into the standby mode from the normal mode, based on the turn-off command.

In an embodiment of the disclosure, on receiving the power control signal PS_ON, the controller 121 may output the first switch control signal SW1 and/or the second switch control signal SW2.

In an embodiment of the disclosure, the controller 121 may repetitively output the switch control signal SW4 as an off signal to open the switch 410 that delivers the operation power to operate the input interface 140 and the switch control signal SW4 as an on signal to close the switch 410, based on the turn-off command for the display apparatus 100.

In an embodiment of the disclosure, the controller 121 may receive the turn-on command for the display apparatus 100 through the input interface 140.

In an embodiment of the disclosure, the controller 121 may output the second switch control signal SW2 to close the second switch 170 to deliver the external power from the external power source 10 to the power supply 110, based on the turn-on command.

In an embodiment of the disclosure, based on outputting the second switch control signal SW2, the controller 121 may output the first switch control signal SW1 to close the first switch 160 to deliver the operation voltage to the main module 130.

In an embodiment of the disclosure, based on the turn-on command, the controller 121 may output the control signal SW3 to turn on the feedback circuit 320.

In an embodiment of the disclosure, based on outputting the control signal SW3, the controller 121 may output the second switch control signal SW2.

In an embodiment of the disclosure, based on outputting the first switch control signal SW1, the controller 121 may receive, from the main module 130, the power control signal PS_ON to switch the display apparatus 100 from the standby mode to the normal mode.

In an embodiment of the disclosure, the controller 121 may provide the first switch control signal SW1, an on time of which increases in a stepwise manner, to the first switch 160.

In an embodiment of the disclosure, the controller 121 may receive a first turn-on command for the display apparatus 100 from the input interface 140.

In an embodiment of the disclosure, the controller 121 may output the switch control signal SW4 to close the switch 410 to deliver power to operate the input interface 140, based on the first turn-on command.

In an embodiment of the disclosure, based on receiving a second turn-on command for the display apparatus 100 from the input interface 140, the controller 121 may output the second switch control signal SW2 and/or the first switch control signal SW1.

In an embodiment of the disclosure, the controller 121 may control the input interface 140 to operate based on the standby voltage.

According to an example embodiment of the disclosure, a method of operating the display apparatus includes: controlling, by a main module operating at an operation voltage, an input interface to receive a turn-off command for the display apparatus, based on the turn-off command, outputting, by the controller operating at a standby voltage, the first switch control signal to open the first switch for delivering the operation voltage to the main module, and outputting, by the controller, the second switch control signal to open the second switch connected between the external power source and the power supply for generating power to be supplied to the display apparatus from the external power source based on outputting the first switch control signal.

In an example embodiment of the disclosure, the method may further include based on outputting the second switch control signal, outputting, by the controller, a control signal to turn off the feedback circuit for outputting a feedback signal when the operation voltage to operate the main module is out of a preset range.

In an example embodiment of the disclosure, the method may further include generating an operation voltage for the main module from the external power source, generating, from the operation voltage, a standby voltage lower than the operation voltage, and receiving, by the controller, the standby voltage.

In an example embodiment of the disclosure, the method may further include controlling, by the main module, the input interface to receive a turn-off command for the display apparatus, based on the turn-off command, outputting, by the main module, a power control signal to switch the display apparatus from the normal mode to the standby mode to the controller, and on receiving a power control signal, outputting, by the controller, the first switch control signal and/or the second switch control signal.

In an example embodiment of the disclosure, the method may further include based on the turn-off command for the display apparatus, repetitively outputting, by the controller, a switch control signal as an off signal to open the switch for delivering operation power to operate the input interface and the switch control signal as an on signal to close the switch.

In an example embodiment of the disclosure, the method may further include receiving, by the controller, a turn-on command for the display apparatus through the input interface, based on the turn-on command, outputting, by the controller, the second switch control signal to close the second switch to deliver external power from the external power source to the power supply, and based on outputting the second switch control signal, outputting, by the controller, the first switch control signal to close the first switch to deliver the operation voltage to the main module.

In an example embodiment of the disclosure, the method may further include based on the operation voltage to operate the main module being out of a preset range, outputting, by the controller, the control signal to turn on the feedback circuit for outputting a feedback signal, and based on outputting the control signal, outputting, by the controller, the second switch control signal.

In an example embodiment of the disclosure, the method may further include, based on outputting the first switch control signal, receiving, by the controller, from the main module, the power control signal to switch the display apparatus from the standby mode to the normal mode.

In an example embodiment of the disclosure, the method may further include operating the input interface to operate based on the standby voltage.

The machine-readable storage medium may be provided in the form of a non-transitory storage medium. The term 'non-transitory storage medium' may refer, for example, to a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the embodiment of the disclosure of the disclosure may be provided in a computer program product. The computer program product may be a commercial product that may be traded between a seller and a buyer. The computer program product may be distributed in the form of a machine-readable storage medium (e.g., a compact disc read only memory (CD-ROM)) or distributed directly between two user devices (e.g., smart phones) or online (e.g., downloaded or uploaded). In the case of the online distribution, at least part of the computer program product (e.g., a downloadable app) may be at least temporarily stored or arbitrarily created in a storage medium that may be readable to a device such as a server of the manufacturer, a server of the application store, or a relay server.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display apparatus comprising:
   a first power supply connected to an external power source;
   an input interface, comprising circuitry, configured to receive a turn-on command for turning on the display apparatus or a turn-off command for turning off the display apparatus;
   a main module, comprising circuitry, configured to control the display apparatus and to operate at an operation voltage;
   a second power supply connected to the external power source and including a controller, comprising control circuitry, configured to operate at a standby voltage, the second power supply configured to generate the operation voltage for operation of the main module and the standby voltage for operation of the controller;
   a first switch connected between a terminal of the operation voltage generated by the second power supply and the main module and controllable by the controller according to a first switch control signal;
   a second switch connected between the external power source and the first power supply and controllable by the controller according to a second switch control signal; and
   a feedback circuit configured to output a feedback signal based on the operation voltage being out of a specified range,
   wherein the controller is configured, based on the turn-off command being received by the input interface, to:
      output the first switch control signal to open the first switch,
      output the second switch control signal to open the second switch, and
      output a feedback circuit control signal to turn off the feedback circuit, based on the outputting of the second switch control signal to open the second switch.

2. The display apparatus of claim 1, wherein the second power supply further comprises:
   a trans circuit configured to generate the operation voltage from the external power source; and
   a standby power supply including a regulator configured to generate, from the operation voltage, the standby voltage, wherein
   the controller is configured to receive the standby voltage from the regulator.

3. The display apparatus of claim 1, wherein:
   the main module comprises at least one processor, comprising processing circuitry, and a memory storing one or more instructions to be executed by the at least one processor,
   at least one processor, individually and/or collectively, is configured to:
      control the input interface to receive the turn-off command, and
      based on the turn-off command, output a power control signal to the controller to switch the display apparatus from a normal mode to a standby mode; and
   based on receiving the power control signal, the controller is configured to output at least one of the first switch control signal to open the first switch or the second switch control signal to open the second switch.

4. The display apparatus of claim 1, further comprising an input interface switch connected between the operation voltage and the input interface, and
   wherein the controller is configured to, based on the turn-off command, repetitively output an input interface switch control signal as an off signal to open the input interface switch and as an on signal to close the input interface switch.

5. The display apparatus of claim 1, wherein the controller is configured, based on the turn-on command being received by the input interface, to:
   output the second switch control signal to close the second switch, and
   output the first switch control signal to close the first switch.

6. The display apparatus of claim 5, wherein
   wherein the controller is configured, based on the turn-on command, to:
      output a feedback circuit control signal to turn on the feedback circuit, and output the second switch control signal to close the second switch.

7. The display apparatus of claim 5, wherein the controller is configured to, based on the outputting of the first switch control signal to close the first switch, receive, from the main module, a power control signal to switch the display apparatus from a standby mode to a normal mode.

8. The display apparatus of claim 5, wherein an on time of the first switch control signal to close the first switch increases in a stepwise manner.

9. The display apparatus claim 5, wherein the controller is configured to:
receive, from the input interface, a first turn-on command for the display apparatus,
output an input interface switch control signal to close an input interface switch to deliver power to operate the input interface, based on the first turn-on command, and
based on receiving a second turn-on command for the display apparatus from the input interface, output at least one of the second switch control signal to close the second switch or the first switch control signal to close the first switch.

10. The display apparatus of claim 1, wherein the controller is configured to control the input interface to operate based on the standby voltage.

11. A method of operating a display apparatus comprising a first power supply connected to an external power source, an input interface, a main module, comprising circuitry, configured to control the display apparatus and operate at an operation voltage, a second power supply connected to the external power source and including a controller, comprising control circuitry, configured to operate at a standby voltage lower than the operation voltage, the second power supply configured to generate the operation voltage for operation of the main module and the standby voltage for operation of the controller, a first switch connected between a terminal of the operation voltage and the main module, a second switch connected between the external power source and the first power supply, and a feedback circuit configured to output a feedback signal based on the operation voltage being out of a specified range, the method comprising:
receiving, via the input interface, a turn-off command for the display apparatus;
based on the turn-off command,
outputting, by the controller, a first switch control signal to open the first switch;
outputting, by the controller, a second switch control signal to open the second switch; and
based on the outputting of the second switch control signal to open the second switch, outputting, by the controller, a feedback circuit control signal to turn off the feedback circuit.

12. The method of claim 11, further comprising:
generating the operation voltage from the external power source;
generating, from the operation voltage, the standby voltage; and
receiving, by the controller, the standby voltage.

13. The method of claim 11, further comprising:
controlling, by the main module, the input interface to receive the turn-off command;
based on the turn-off command, outputting, by the main module, to the controller, a power control signal to switch the display apparatus from a normal mode to a standby mode; and
based on receiving the power control signal, outputting, by the controller, at least one of the first switch control signal to open the first switch or the second switch control signal to open the second switch.

14. The method of claim 11, further comprising:
based on the turn-off command, repetitively outputting, by the controller, an input interface switch control signal as an off signal to open an input interface switch as an on signal to close the input interface switch.

15. The method of claim 11, further comprising:
receiving, by the controller, a turn-on command for the display apparatus through the input interface; and
based on the turn-on command,
outputting, by the controller, the second switch control signal to close the second switch, and
outputting, by the controller, the first switch control signal to close the first switch.

16. The method of claim 15, further comprising:
outputting, by the controller, a feedback circuit control signal to turn on the feedback circuit; and
based on the outputting of the feedback circuit control signal, outputting, by the controller, the second switch control signal to close the second switch.

17. The method of claim 15, further comprising:
based on the outputting of the first switch control signal to close the first switch, receiving, by the controller from the main module, a power control signal to switch the display apparatus from a standby mode to a normal mode.

18. The method of claim 11, further comprising:
operating the input interface based on the standby voltage.

* * * * *